US010157110B2

(12) United States Patent
Okada

(10) Patent No.: US 10,157,110 B2
(45) Date of Patent: Dec. 18, 2018

(54) DISTRIBUTED SYSTEM, SERVER COMPUTER, DISTRIBUTED MANAGEMENT SERVER, AND FAILURE PREVENTION METHOD

(71) Applicant: NEC Corporation, Minato-ku, Tokyo (JP)

(72) Inventor: Yoshihiro Okada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 108 days.

(21) Appl. No.: 15/096,422

(22) Filed: Apr. 12, 2016

(65) Prior Publication Data

US 2016/0224444 A1 Aug. 4, 2016

Related U.S. Application Data

(63) Continuation-in-part of application No. 14/035,311, filed on Sep. 24, 2013, now Pat. No. 9,342,426.

(30) Foreign Application Priority Data

Sep. 24, 2012 (JP) .................................. 2012-209911

(51) Int. Cl.
*G06F 11/20* (2006.01)
*G06F 11/07* (2006.01)
(Continued)

(52) U.S. Cl.
CPC ........ *G06F 11/2033* (2013.01); *G06F 11/076* (2013.01); *G06F 11/0709* (2013.01);
(Continued)

(58) Field of Classification Search
CPC ............... G06F 11/079; G06F 11/2071; G06F 11/2069; G06F 11/2025; G06F 11/2097;
(Continued)

(56) References Cited

U.S. PATENT DOCUMENTS

| 6,282,568 B1 | 8/2001 | Sondur et al. |
| 7,657,657 B2 * | 2/2010 | Rao ..................... H04L 63/0272 707/682 |

(Continued)

FOREIGN PATENT DOCUMENTS

| CN | 101127766 A | 2/2008 |
| CN | 101771724 A | 7/2010 |

(Continued)

OTHER PUBLICATIONS

Chinese Office Action for CN Application No. 201310439457.8 dated Dec. 5, 2016 with English Translation.

(Continued)

*Primary Examiner* — Nadeem Iqbal

(57) ABSTRACT

A distributed system according to an exemplary embodiment includes first and second servers capable of executing the same application, wherein when a failure occurs in the application in the first server, the first server generates failure information identifying a cause of the failure in the application, and the second server performs failure prevention processing which is determined based on the failure information and intended to prevent a failure in the application.

16 Claims, 19 Drawing Sheets

(51) Int. Cl.
*G06F 11/273* (2006.01)
*G06F 11/14* (2006.01)

(52) U.S. Cl.
CPC ........ *G06F 11/079* (2013.01); *G06F 11/0715* (2013.01); *G06F 11/0772* (2013.01); *G06F 11/0793* (2013.01); *G06F 11/2736* (2013.01); *G06F 11/1438* (2013.01); *G06F 2201/805* (2013.01)

(58) Field of Classification Search
CPC ............. G06F 11/3692; G06F 11/3684; G06F 11/2048; G06F 11/2028
See application file for complete search history.

(56) References Cited

U.S. PATENT DOCUMENTS

| | | | | |
|---|---|---|---|---|
| 7,941,698 B1* | 5/2011 | Aggarwal | ........... | G06F 11/1641 714/10 |
| 8,037,350 B1* | 10/2011 | Aggarwal | ........... | G06F 11/1641 714/10 |
| 8,065,569 B2* | 11/2011 | Kawamura | ......... | G06F 11/0748 714/48 |
| 2007/0067663 A1* | 3/2007 | Surasinghe | ......... | G06F 11/1482 714/4.1 |
| 2007/0180314 A1* | 8/2007 | Kawashima | ........ | G06F 11/2023 714/15 |
| 2009/0235112 A1* | 9/2009 | Kawamura | ......... | G06F 11/0748 714/5.11 |
| 2010/0169284 A1 | 7/2010 | Walter et al. | | |
| 2010/0299551 A1 | 11/2010 | Han et al. | | |
| 2012/0210198 A1* | 8/2012 | Gale | ................... | G06F 11/1679 714/807 |

FOREIGN PATENT DOCUMENTS

| | | |
|---|---|---|
| CN | 101853186 A | 10/2010 |
| JP | H03-81838 A | 4/1991 |
| JP | 2002-014880 A | 1/2002 |
| JP | 2003-296141 | 10/2003 |
| JP | 2005-209029 A | 8/2005 |
| JP | 2006-338069 A | 12/2006 |
| JP | 2010-009127 A | 1/2010 |
| JP | 2010-186441 A | 8/2010 |

OTHER PUBLICATIONS

Chinese Office Action for CN Application No. 201310439457.8 dated Apr. 11, 2016 with English Translation.
Japanese Office Action for JP Application No. 2012-209911 dated May 10, 2016 with English Translation.

* cited by examiner

| COMPONENT NAME | INTERFACE NAME | FAILURE TYPE | FREQUENCY | THRESHOLD | RECOVERY ACTION |
|---|---|---|---|---|---|
| COMPONENT D | Dm | EXCESSIVE MEMORY CONSUMPTION | 1 | 3 | FORCED GC |
| COMPONENT H | Hm | EXCESSIVE CPU CONSUMPTION | 2 | 3 | CHANGE OF PROCESSING PRIORITY |
| ... | ... | ... | | | |

Fig. 5

| COMPONENT NAME | INTERFACE NAME | FAILURE TYPE | RELATED COMPONENT NAME | RELATED INTERFACE NAME |
|---|---|---|---|---|
| COMPONENT A | Am | DEADLOCK | COMPONENT B | Bm |
| COMPONENT B | Bm | DEADLOCK | COMPONENT A | Am |
| COMPONENT D | Dm | EXCESSIVE MEMORY CONSUMPTION | | |
| COMPONENT H | Hm | EXCESSIVE CPU CONSUMPTION | | |
| ... | | ... | ... | |

Fig. 7

| COMPONENT NAME | INTERFACE NAME | FAILURE TYPE | RELATED COMPONENT NAME | RELATED INTERFACE NAME | FREQUENCY | THRESHOLD | RECOVERY ACTION |
|---|---|---|---|---|---|---|---|
| COMPONENT A | Am | EXCESSIVE MEMORY CONSUMPTION | | | 1 | 3 | FORCED GC |
| COMPONENT C | Cm | EXCESSIVE MEMORY CONSUMPTION | | | 1 | 3 | FORCED GC |
| COMPONENT E | Em | EXCESSIVE MEMORY CONSUMPTION | | | 1 | 3 | FORCED GC |
| : | : | : | : | | | | |

Fig. 10A

| COMPONENT NAME | INTERFACE NAME | FAILURE TYPE | RELATED COMPONENT NAME | RELATED INTERFACE NAME | FREQUENCY | THRESHOLD | RECOVERY ACTION |
|---|---|---|---|---|---|---|---|
| COMPONENT A | Am | EXCESSIVE MEMORY CONSUMPTION | | | 2 | 3 | FORCED GC |
| COMPONENT B | Bm | EXCESSIVE MEMORY CONSUMPTION | | | 1 | 3 | FORCED GC |
| COMPONENT C | Cm | EXCESSIVE MEMORY CONSUMPTION | | | 2 | 3 | FORCED GC |
| COMPONENT E | Em | EXCESSIVE MEMORY CONSUMPTION | | | 1 | 3 | FORCED GC |
| ... | ... | ... | | | | | |

Fig. 10B

| COMPONENT NAME | INTERFACE NAME | FAILURE TYPE | RELATED COMPONENT NAME | RELATED INTERFACE NAME | FREQUENCY | THRESHOLD | RECOVERY ACTION |
|---|---|---|---|---|---|---|---|
| COMPONENT A | Am | EXCESSIVE MEMORY CONSUMPTION | | | 3 | 3 | FORCED GC |
| COMPONENT B | Bm | EXCESSIVE MEMORY CONSUMPTION | | | 1 | 3 | FORCED GC |
| COMPONENT C | Cm | EXCESSIVE MEMORY CONSUMPTION | | | 2 | 3 | FORCED GC |
| COMPONENT D | Dm | EXCESSIVE MEMORY CONSUMPTION | | | 1 | 3 | FORCED GC |
| COMPONENT E | Em | EXCESSIVE MEMORY CONSUMPTION | | | 2 | 3 | FORCED GC |
| .. | .. | .. | .. | | | | |

Fig. 10C

| COMPONENT NAME | INTERFACE NAME | FAILURE TYPE | RELATED COMPONENT NAME | RELATED INTERFACE NAME | FREQUENCY | THRESHOLD | RECOVERY ACTION |
|---|---|---|---|---|---|---|---|
| COMPONENT A | Am | EXCESSIVE CPU CONSUMPTION | | | 1 | 3 | CHANGE OF PROCESSING PRIORITY |
| COMPONENT C | Cm | EXCESSIVE CPU CONSUMPTION | | | 1 | 3 | CHANGE OF PROCESSING PRIORITY |
| COMPONENT E | Em | EXCESSIVE CPU CONSUMPTION | | | 1 | 3 | CHANGE OF PROCESSING PRIORITY |
| ‥ | ‥ | ‥ | ‥ | | | | |

Fig. 12A

| COMPONENT NAME | INTERFACE NAME | FAILURE TYPE | RELATED COMPONENT NAME | RELATED INTERFACE NAME | FREQUENCY | THRESHOLD | RECOVERY ACTION |
|---|---|---|---|---|---|---|---|
| COMPONENT A | Am | EXCESSIVE CPU CONSUMPTION | | | 2 | 3 | CHANGE OF PROCESSING PRIORITY |
| COMPONENT B | Bm | EXCESSIVE CPU CONSUMPTION | | | 1 | 3 | CHANGE OF PROCESSING PRIORITY |
| COMPONENT C | Cm | EXCESSIVE CPU CONSUMPTION | | | 2 | 3 | CHANGE OF PROCESSING PRIORITY |
| COMPONENT E | Em | EXCESSIVE CPU CONSUMPTION | | | 1 | 3 | CHANGE OF PROCESSING PRIORITY |
| .. | .. | .. | .. | | | | |

Fig. 12B

| COMPONENT NAME | INTERFACE NAME | FAILURE TYPE | RELATED COMPONENT NAME | RELATED INTERFACE NAME | FREQUENCY | THRESHOLD | RECOVERY ACTION |
|---|---|---|---|---|---|---|---|
| COMPONENT A | Am | EXCESSIVE CPU CONSUMPTION | | | 3 | 3 | CHANGE OF PROCESSING PRIORITY |
| COMPONENT B | Bm | EXCESSIVE CPU CONSUMPTION | | | 1 | 3 | CHANGE OF PROCESSING PRIORITY |
| COMPONENT C | Cm | EXCESSIVE CPU CONSUMPTION | | | 2 | 3 | CHANGE OF PROCESSING PRIORITY |
| COMPONENT D | Dm | EXCESSIVE CPU CONSUMPTION | | | 1 | 3 | CHANGE OF PROCESSING PRIORITY |
| COMPONENT E | Em | EXCESSIVE CPU CONSUMPTION | | | 2 | 3 | CHANGE OF PROCESSING PRIORITY |
| ⋮ | ⋮ | ⋮ | ⋮ | | | | |

Fig. 12C

DISTRIBUTED SYSTEM, SERVER COMPUTER, DISTRIBUTED MANAGEMENT SERVER, AND FAILURE PREVENTION METHOD

INCORPORATION BY REFERENCE

This application is continuation application of U.S. patent application Ser. No. 14/035,311 filed on Sep. 24, 2013, which claims priority from Japanese Patent application No. 2012-209911, filed on Sep. 24, 2012, the disclosure of which is incorporated herein in its entirety by reference.

BACKGROUND OF THE INVENTION

1. Technical Field

The present application relates to a distributed system, server computer, distributed management server, and failure prevention method.

2. Background Art

A failure often occurs in a business system due to a defect in a business application program implemented on an application server, causing the entire business system to fail. Examples of a failure in a business application include the following.

A first example is a deadlock. A deadlock refers to a state in which multiple threads which are executing application logic exert exclusive control (acquisition of lock, etc.) over each other and thus the execution of each thread remains blocked. In this case, there occur problems, such as one in which a client application serving as the caller of an application, such as a browser, cannot obtain a response to a request, failing to update the screen.

A second example is excessive memory consumption. Excessive memory consumption refers to a state in which the memory area available to an application server is reduced due to one-time execution of application logic which handles a great amount of data in query processing related to business, for example. In this state, a delay may occur in processing of a thread which is executing another application logic which is running on the same process in parallel, or an error may occur due to a memory shortage during processing. At worst, the process of the application server aborts.

A third example is excessive central processing unit (CPU) consumption (excessively high CPU usage). Excessive CPU consumption refers to a state in which the CPU is being used more than necessary due to occurrence of an infinite loop, or redundant application logic. In this case, there arises, for example, a problem that the caller of the application cannot obtain a response to a request, failing to update the screen. There also arises a problem that a delay occurs in processing of a thread which is executing another application logic which is running on the same process in parallel.

When such an event occurs, it usually can be eliminated by restarting the failed application server. In any case, however, a fundamental solution requires modification of the application program in question. For this reason, the system operator may have to take temporary measures, such as periodical restart of the application server or tuning of the parameters with respect to the application server, so as to prevent recurrence of a failure as described above until the application is modified.

Japanese Unexamined Patent Application Publication No. 2010-9127 discloses, as a technology for handling a failure, a management apparatus that identifies a component acting as the cause of a failure. Specifically, when an abnormality occurs in a system in which a computer including an application server and a computer including a management system are connected together via a network, the management apparatus can determine in which of the application server and the management system the failure has occurred.

Japanese Unexamined Patent Application Publication No. 2006-338069 discloses a component software operation infrastructure that prevents an error from occurring in response to a sign or occurrence of a failure, as well as prevents a reduction in performance. Specifically, during execution of component software including multiple components (software components), the component software operation infrastructure replaces a component with another.

Japanese Unexamined Patent Application Publication No. 2005-209029 discloses an application management system including multiple application server computers and a management server computer. Each application server computer refers to an application operation definition storage file stored in the management server computer to control and manage the execution of an application whose execution has been requested. When a failure occurs in an application being executed by an application server computer, the application server computer notifies the other application server computers or external computers of that fact.

Currently, systematization using cloud computing technology is becoming widespread. Such systematization refers to constructing a system using a great number of application servers distributed on many networks. In such an environment, the load is distributed. Accordingly, an abnormality occurring in a single server (due, for example, to occurrence of a failure) is less likely to cause the entire system to fail.

However, if the failure is caused by a problem associated with the application program itself, all the application servers have a potential risk of experiencing the same failure in future. For this reason, the system operator must inevitably take a temporary measure as described above, unless he or she takes a measure, such as downgrading of the failed application to a previous version. Further, as the number of servers increases, such a failure is more likely to occur in the system. This results in an increase in the operating cost for taking temporary measures.

Any of Japanese Unexamined Patent Application Publication Nos. 2010-9127 and 2006-338069 does not consider a situation in which multiple servers, such as application servers, are disposed as in cloud computing.

For an application management system according to Japanese Unexamined Patent Application Publication No. 2005-209029, when an abnormality occurs in an application which is being executed by an application server computer, it cannot prevent a similar abnormality from occurring in another application server computer.

SUMMARY

An example of the object of the present invention is to provide a distributed system, server computer, distributed management server, and failure prevention method that prevent a failure in a server without imposing a load on the system operator.

In a first exemplary aspect of the invention, a distributed system includes: first and second servers capable of executing the same application, wherein when a failure occurs in the application in the first server, the first server generates failure information identifying a cause of the failure in the application, and the second server performs failure prevention processing which is determined based on the failure information and intended to prevent a failure in the application.

In a second exemplary aspect, a server computer disposed in a distributed system and connected to another server computer capable of executing the same application, wherein when a failure occurs in the application, the server computer generates failure information identifying a cause of the failure in the application, and when the other server generates failure information identifying a cause of a failure in the application, the server computer performs failure prevention processing which is determined based on the failure information and intended to prevent a failure in the application.

In a third exemplary aspect, a distributed management server disposed in a distributed system including first and second servers capable of executing the same application, wherein when the distributed management server receives, from the first server, failure information identifying a cause of a failure in the application in the first server, the distributed management server transmits, to the second server, the failure information serving as information that the second server uses to perform failure prevention processing for preventing a failure in the application.

In a fourth exemplary aspect, in a distributed system including first and second servers capable of executing the same application, a failure prevention method for preventing a failure in the application, includes:

when a failure occurs in the application in the first server, generating, by the first server, failure information identifying a cause of the failure in the application, and performing, by the second server, failure prevention processing which is determined based on the failure information and intended to prevent a failure in the application.

In light of the foregoing, it is possible to provide a distributed system, server computer, distributed management server, and failure prevention method that prevent a failure in a server without imposing a load on the system operator.

BRIEF DESCRIPTION OF THE DRAWINGS

The above and other objects, features and advantages of the present invention will become more fully understood from the detailed description given herein below and the accompanying drawings which are given by way of illustration only, and thus are not to be considered as limiting the present invention.

FIG. 5 is a conceptual diagram of data stored in the potential failure storage unit according to the second embodiment;

FIG. 7 is a conceptual diagram of an example of data stored in the failure information storage unit 16 according to the second embodiment;

FIG. 10A is a table showing an example of data stored in the failure information storage unit 16 at time t1 according to the second embodiment;

FIG. 10B is a table showing an example of data stored in the failure information storage unit 16 at time t2 according to the second embodiment;

FIG. 10C is a table showing an example of data stored in the failure information storage unit 16 at time t3 according to the second embodiment;

FIG. 12A is a table showing an example of the data in the failure information storage unit 16 at time t4 according to the second embodiment;

FIG. 12B is a table showing an example of the data in the failure information storage unit 16 at time t5 according to the second embodiment;

FIG. 12C is a table showing an example of the data in the failure information storage unit 16 at time t6 according to the second embodiment;

EXEMPLARY EMBODIMENT

First Embodiment

Figure 1:
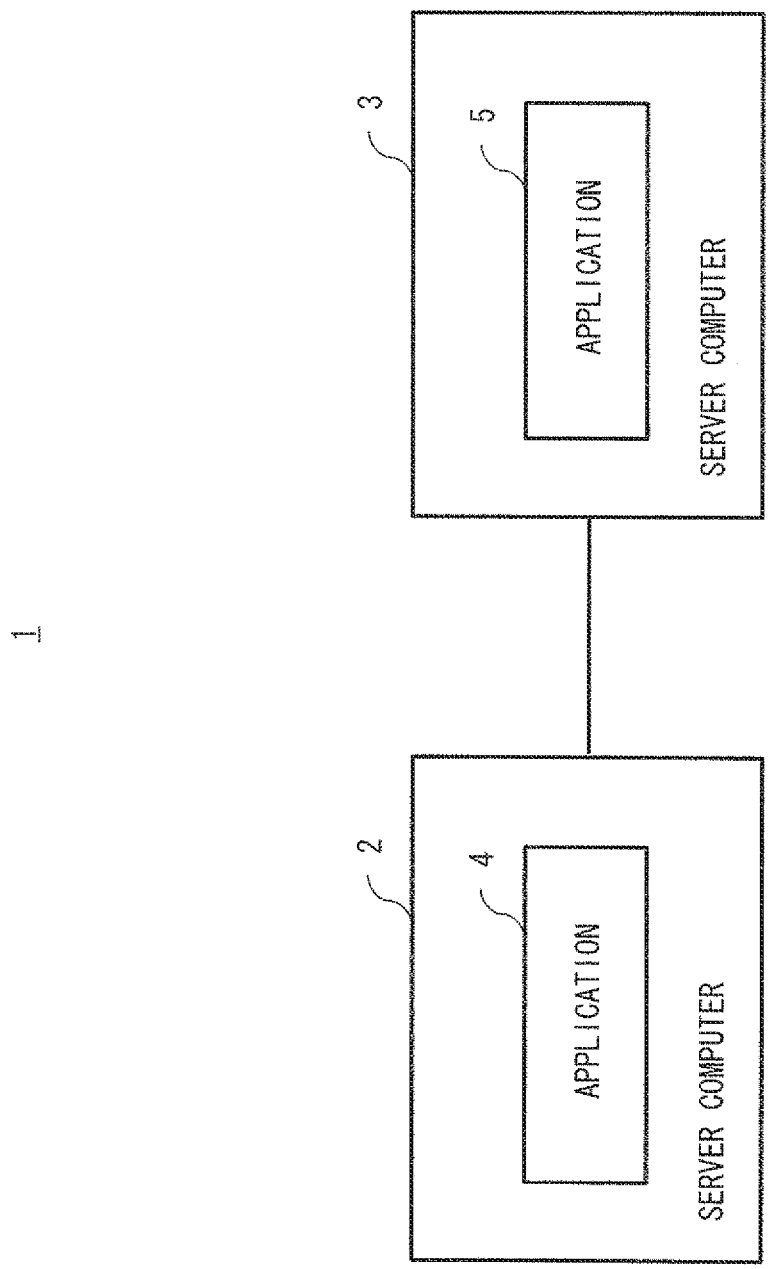
FIG. 1 is a block diagram showing a first example configuration of a distributed system according to the first embodiment.

Now, a first embodiment of the present invention will be described with reference to the drawings. FIG. 1 is a block diagram showing an example configuration of a distributed system 1 according to the first embodiment.

The distributed system 1 includes a server computer 2 (first server) and a server computer 3 (second server) both capable of executing the same application. The distributed system 1 is, for example, a distributed system using cloud computing. The number of server computers included in the distributed system 1 is not limited to two and may be three or more. The server computers 2 and 3 are storing the same applications, applications 4 and 5, in such a manner that the applications 4 and 5 are executable.

When a failure occurs in the application 4 being executed by the server computer 2, the server computer 2 generates failure information identifying the cause of the failure in the application 4. As used herein, the failure information refers to, for example, a component which has caused the failure to the application 4, or an interface associated with the component. Specifically, the failure information may be data of the interface or the component, name of the interface or the component, or the like.

The server computer 3 performs failure prevention processing which is determined based on the failure information generated by the server computer 2 and intended to prevent a failure in the application 5.

For example, assume that a failure occurs in the server computer 2 due to a request from a client thereof and then the server computer 2 generates failure information related to the failure. In this case, the server computer 3 monitors a request from a client thereof on the basis of the failure information, that is, performs failure prevention processing. As an example of monitoring, the server computer 3 determines whether the same function as the function of the application requested by the request from the client, which has caused the failure to the server computer 2, is being requested by a client of the server computer 3. If the same function is being requested by a client of the server computer 3, the server computer 3 prevents the same failure as that in the server computer 2, for example, by stopping performing that function.

By performing processing as described above, the distributed system 1 can prevent a failure in a server without the system operator having to perform some processing (without imposing a load on the system operator).

Modification 1

The server computer 2 described above may further perform processing performed by the server computer 3. Specifically, when a failure occurs in the application 4, the server computer 2 generates failure information identifying the cause of the failure in the application 4. When the server computer 3 generates failure information identifying the cause of a failure in the application 5, the server computer 2 performs failure prevention processing which is determined on the basis of that failure information and intended to prevent a failure in the application 4. Similarly, the server computer 3 may perform processing performed by the server computer 2. That is, each server computer can generate, when a failure occurs therein, failure information which is necessary for another server computer to perform failure prevention processing, as well as can perform, when another server computer generates failure information, failure prevention processing on the basis of that failure information. By including such server computers in the distributed system 1, it is possible to prevent failures in the distributed system 1 more efficiently.

Modification 2

Figure 2:
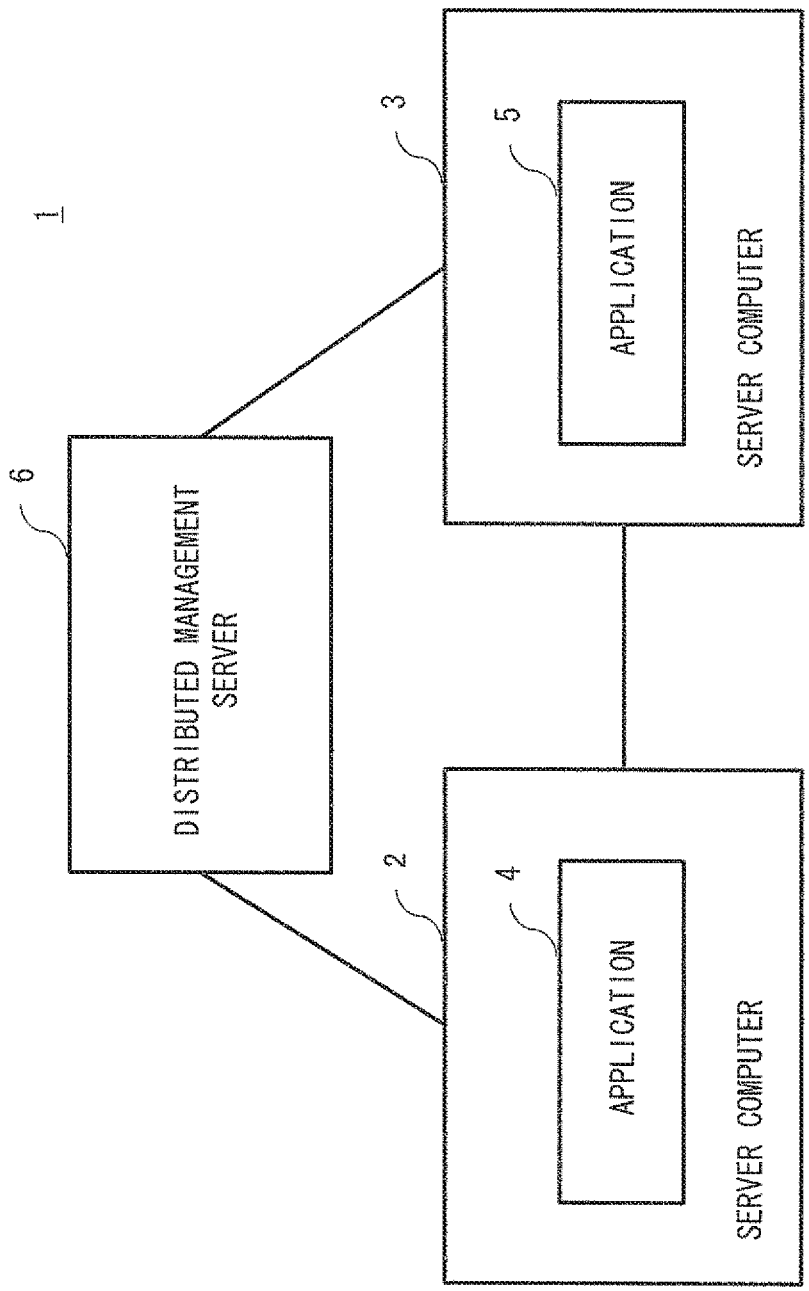
FIG. 2 is a block diagram showing a second example configuration of a distributed system according to the first embodiment.

The distributed system 1 may include a distributed management server 6 that manages the distributed system 1, in addition to the server computers 2 and 3. FIG. 2 is a block diagram showing an example configuration of the distributed system 1 as described above. In the distributed system 1, the distributed management server 6 is connected to the server computers 2 and 3. The server computers 2 and 3 are similar to those described with reference to FIG. 1.

The distributed management server 6 receives, from the server computer 2, failure information identifying the cause of a failure in the application installed in the server computer 2. The distributed management server 6 transmits, to the server computer 3, the failure information serving as information which the server computer 3 uses to perform failure prevention processing for preventing a failure in the application 5. By performing the above processing, the distributed management server 6 can prevent a failure in the server computer 3.

Details of the failure prevention processing performed by the server computer 3 may be determined by any of the server computer 3 and the distributed management server 6 on the basis of the failure information.

Second Embodiment

Figure 3:
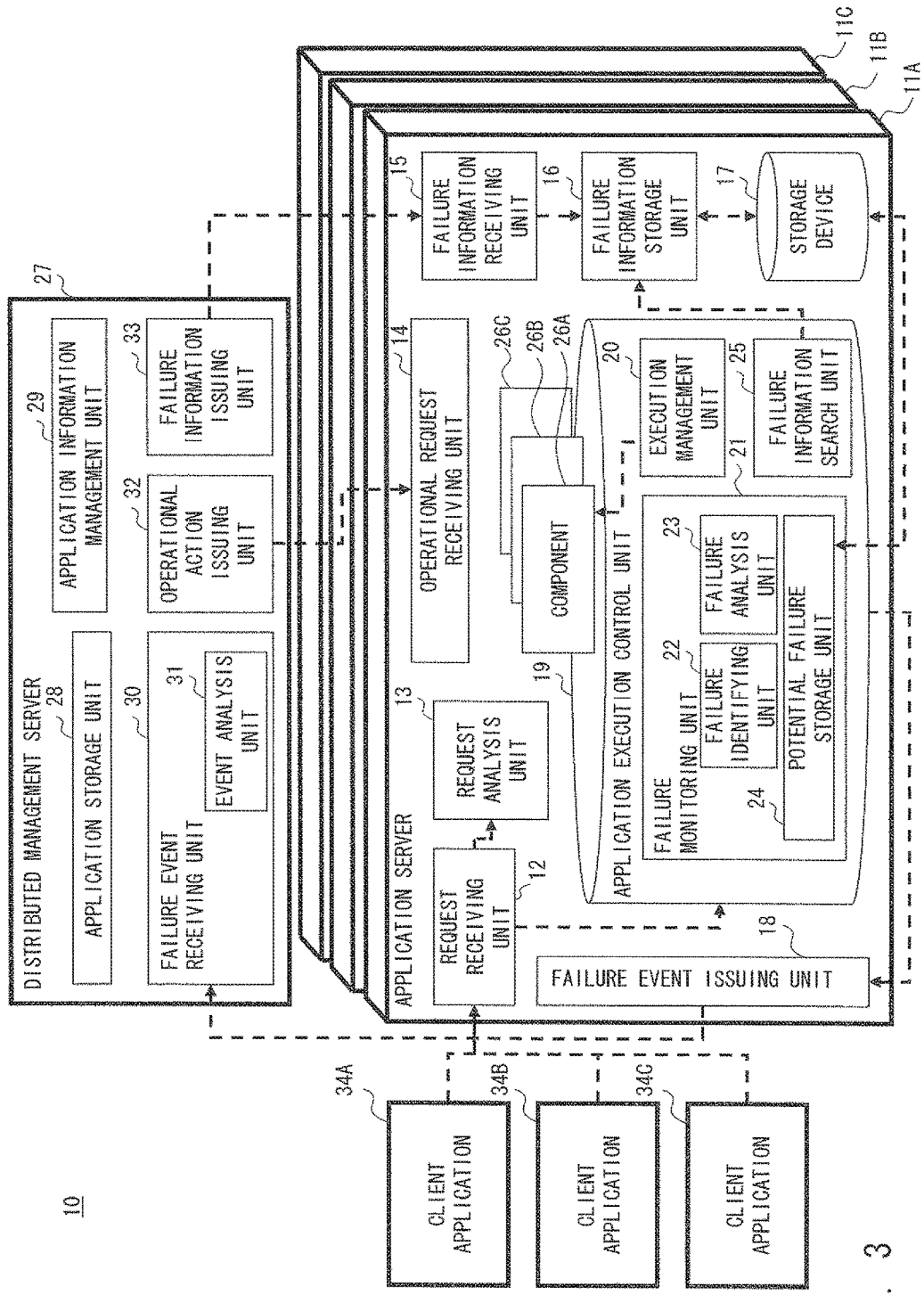
FIG. 3 is a block diagram showing an example configuration of a distributed management system according to the second embodiment.

Now, a second embodiment of the present invention will be described with reference to the drawings. FIG. 3 is a block diagram showing an example configuration of a distributed management system 10 according to the second embodiment.

The distributed management system 10 includes application servers 11A, 11B, and 11C, a distributed management server 27, and client applications 34A, 34B, and 34C. Hereafter, the application servers 11A, 11B, and 11C will be collectively referred to as the application server 11; the client applications 34A, 34B, and 34C collectively as the client application 34.

The application server 11 functions as a business application execution infrastructure in the distributed management system 10. The application server 11 includes, for example, software executed by a server computer including resources, such as a CPU and memory, and hardware of the server computer used in the processing of the software. The application server 11 includes a request receiving unit 12, a request analysis unit 13, an operational request receiving unit 14, a failure information receiving unit 15, a failure information storage unit 16, a storage device 17, a failure event issuing unit 18, and an application execution control unit 19. The application servers 11A, 11B, and 11C are distributed on a network of the distributed management system 10 and each have the same configuration. The application servers 11A, 11B, and 11C are executed by different computers.

The request receiving unit 12 receives a request which a system user transmits using the client application 34.

The request analysis unit 13 analyzes detailed information of the request received by the request receiving unit 12.

The operational request receiving unit 14 receives a request for operation management made to the application server 11 by the distributed management server 27.

The failure information receiving unit 15 receives, from the distributed management server 27, information about a failure that has occurred in another application server.

The failure information storage unit 16 stores, in an internal memory thereof, the failure information received by the failure information receiving unit 15. The storage device 17 is a storage device which stores failure information data in a non-transitory manner, and the failure information storage unit 16 stores the failure information in the storage device 17 as necessary.

The failure event issuing unit 18 transmits information about a failure that has occurred in an application installed in the application server 11, to other application servers which are connected to the application server 11 via the distributed management server 27.

The application execution control unit 19 controls the execution of applications installed in the application server 11. The application execution control unit includes an execution management unit 20, a failure monitoring unit 21, a failure identifying unit 22, a failure analysis unit 23, a potential failure storage unit 24, a failure information search unit 25, and components (application components) 26A, 26B, and 26C. Hereafter, components 26A, 26B, and 26C will be collectively referred to as the component 26.

The execution management unit 20 manages the execution state of the component 26 that operates in the application execution control unit 19. Specifically, the execution management unit 20 manages in formation indicating that an application is being called or information about a request being executed currently and about a thread which is executing the request.

The failure monitoring unit 21 monitors a failure in applications installed in the application server 11. For example, the failure monitoring unit 21 acquires a list of information about threads of a process (thread dump) or various types of resource information, such as memory usage and CPU usage.

The failure identifying unit 22 identifies details of a failure detected by the failure monitoring unit 21. Specifically, the failure identifying unit 22 extracts the identifier of a component (component name) and the name of an interface of the component from the various types of resource information acquired by the failure monitoring unit 21.

The failure analysis unit 23 analyses an occurring failure in detail or performs computation related to the prediction of a failure on the basis of the information extracted by the failure identifying unit 22 through the identification.

The potential failure storage unit 24 stores information about a failure predicted by the failure analysis unit 23. This information is updated by the failure analysis unit 23.

The failure information search unit 25 searches the failure information storage unit 16 for failure information with respect to the application.

The component 26 forms an application which is actually installed in the application server 11 (an application stored in a manner to be executable by the computer of the application server). The component 26 has business logic implemented thereon. The component 26 runs on the application execution control unit 19. The application servers 11A to 11C have the same applications installed thereon and therefore include the same components 26A to 26C. Note that the components 26A to 26C do not need to form the same application.

The distributed management server 27 is a dedicated server that centrally manages application servers distributed on the network configuration of the distributed management system 10. The system administrator can manage the distributed management system 10 by using the distributed management server 27. The distributed management server 27 includes an application storage unit 28, an application information management unit 29, a failure event receiving unit 30, an operational action issuing unit 32, and a failure information issuing unit 33.

The application storage unit 28 is storing the same applications as the applications installed in the application server 11.

The application information management unit 29 manages detailed information (version information, etc.) about the applications installed in the application server 11.

The failure event receiving unit 30 receives an event issued by the failure event issuing unit 18 of each application server and including failure information. The failure event receiving unit 30 includes an event analysis unit 31. The event analysis unit 31 analyzes, on the basis of the received event, details of a failure that has occurred in the application server 11.

The operational action issuing unit 32 transmits any operational action request to the application servers 11 under the management thereof.

The failure information issuing unit 33 transmits failure information extracted by the failure identifying unit 22 of a particular application server 11 to the application servers 11 under the management thereof.

The client application 34 is an application for client that a system user (client) uses to call business logic of the applications installed in the application servers.

The elements of the application server 11 and distributed management server 27 shown in FIG. 3 as function blocks that perform various types of processing can be formed by a CPU, a memory, and other circuits in terms of hardware; these elements are achieved by a program loaded into the memory in terms of software, for example. Accordingly, it will be appreciated by those skilled in the art that these function blocks can be achieved using hardware alone, software alone, or combinations thereof in various forms but are not limited to one of these.

Hereafter, an example operation of the distributed management system 10 according to the second embodiment will be described in detail with reference to the drawings.

First, the flow of the basic processing of the application server 11 will be described.

The application server 11 receives a request from the client application 34, such as a Web browser, via the request receiving unit 12.

The request analysis unit 13 analyzes the request received by the request receiving unit 12 to extract information about the component 26 to be called by the request and about an interface (method) of the component. The request analysis unit 13 transmits the extraction result serving as a parameter to the application execution control unit 19.

The application execution control unit 19 stores, in the execution management unit 20, information indicating that the application is being called and then executes business logic using the interface of the component 26 requested.

When the execution of the business logic is complete, the application execution control unit 19 deletes the information stored in the execution management unit 20. This series of processing is performed by a thread of a process that runs the application server 11 on a request basis.

Further, the distributed management server 27 properly manages basic information (host name or the like) about the distributed application servers 11 or information about the configuration of the applications installed in the application servers 11 (application name, version name, or the like). The application servers 11 are previously distributed on the basis of operational work of the system operator. Furthermore, the distributed management server 27 can instruct all the application servers 11 under the management thereof to perform installation or update of an application, a change in the setting of the application server, or the like.

The following items with respect to failure detection are set in the application server 11 according to the second embodiment.

1. Recovery Action (Recovery Processing) when a "Deadlock" is Detected

A recovery action taken on the application server 11 when a deadlock is detected while the application is called is specified in this item. In the second embodiment, options of the recovery action at least include "restart of the application server" and "downgrading of the application to a previous version."

2. Memory Usage Threshold for Determining "Excessive Memory Consumption"

A memory usage for determining that the memory of the application server 11 is being consumed excessively is set in this item. When the actual memory usage of the application server 11 becomes greater than or equal to the value set in this item, the application server 11 determines that the memory is being consumed excessively.

3. Frequency Threshold for Determining the Cause when Detecting "Excessive Memory Consumption"

The entry frequency of component name and interface name for determining the cause when the memory is being consumed excessively (failure frequency) is specified in this item. When a component name and interface name are entered at a frequency greater than or equal to the specified frequency, the application server 11 determines the entered component name and interface name as the cause of the excessive memory consumption.

4. Recovery Action when Detecting "Excessive Memory Consumption"

This item includes options of a recovery action taken on the application server when detecting excessive memory consumption. The recovery action options at least include "forced execution of garbage collection (GC)" and "downgrading of the application of a previous version."

5. CPU Usage Threshold for Determining "Excessive CPU Consumption"

A CPU usage for determining that the CPU of the application server 11 is being consumed excessively is set in this item. When the actual CPU usage of the application server 11 becomes greater than or equal to the set value, the application server 11 determines that the CPU is being consumed excessively.

6. Frequency Threshold for Determining the Cause when Detecting "Excessive CPU Consumption"

The entry frequency of application component name and interface name for determining the cause when detecting that the CPU is being consumed excessively is specified in this item. When an application component name and interface name are entered at a frequency greater than or equal to the specified frequency, the application server 11 determines the application component name and interface name are the cause of the excessive CPU consumption.

7. Recovery Action when Detecting "Excessive CPU Consumption"

A recovery action taken on the application server when detecting excessive CPU consumption is selected in this item. The recovery action options at least include "change of processing priority" and "downgrading of the application to a previous version."

The above items are previously set to appropriate values (criteria) either by the system operator or according to the specification of the application server 11. The application server 11 detects a failure in an application using the following method. For example, the application server 11 itself periodically monitors the consumption state of the resources or the occurrence state of a failure using an application programming interface (API) provided by the operating system (OS) or the execution environment of the program. Alternatively, in an execution environment in which occurrence of a failure is issued as an internal event, the application execution control unit 19 of the application server 11 detects a failure by receiving such an event.

Figure 4A:
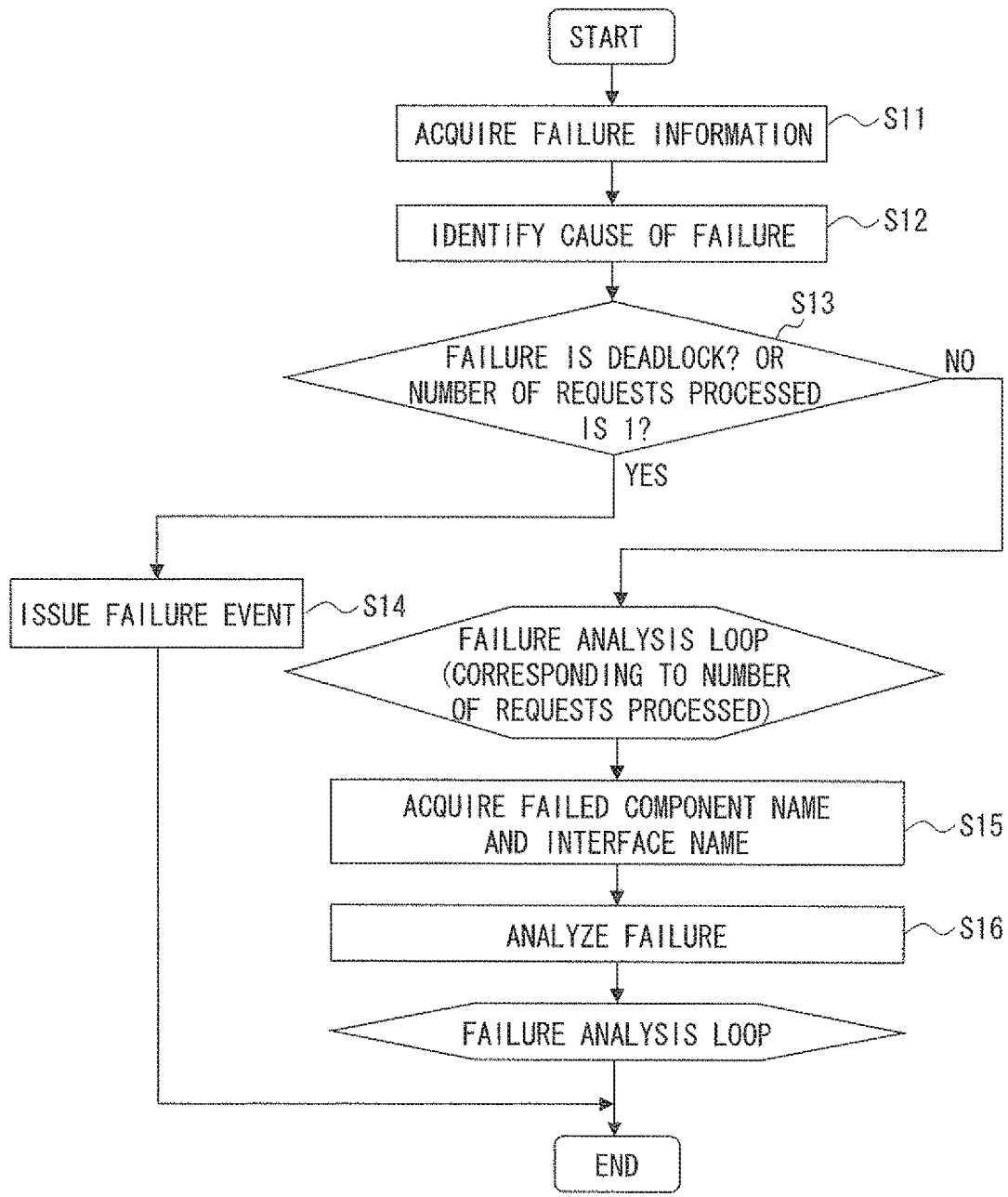
FIG. 4A is a first flowchart showing an example of processing performed by the application server according to the second embodiment.
Figure 4B:
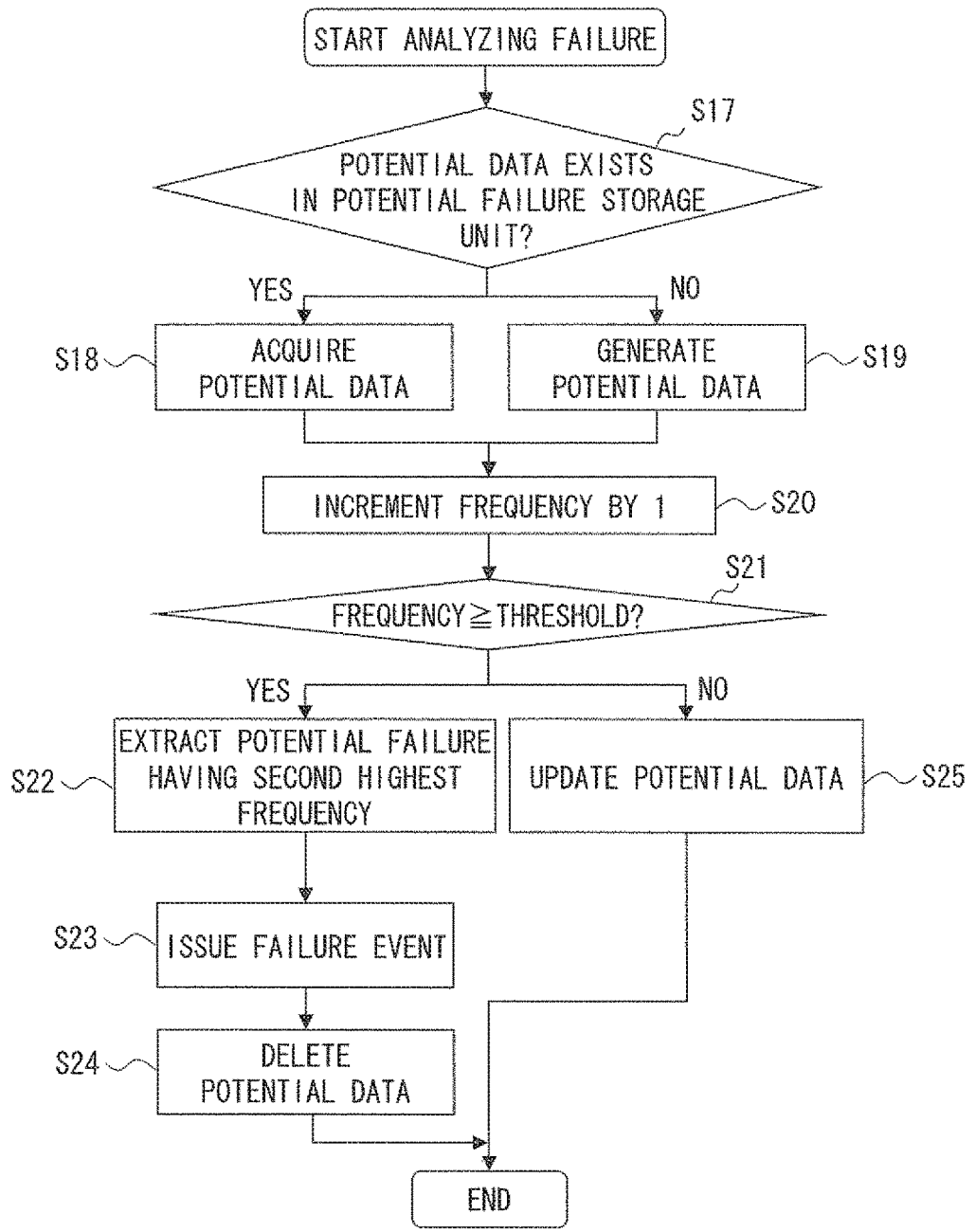
FIG. 4B is a second flowchart showing an example of processing performed by the application server according to the second embodiment.

FIGS. 4A and 4B are flowcharts showing an example of processing performed by the application server 11. Using the above description as a premise, processing that the application server 11 performs when a failure occurs therein will be described with reference to FIGS. 4A and 4B.

When a failure is detected in the application server 11 using a method as shown above, the failure monitoring unit 21 of the application server 11 acquires a list of information about the threads of the process or information about resources, such as memory usage or CPU usage (failure information) (step S11).

Using the failure identifying unit 22, the application execution control unit 19 identifies the type of the occurring failure (the cause of the failure) from various types of resource information acquired by the failure monitoring unit 21 (step S12).

The application execution control unit 19 determines whether the type the failure identified by the failure identifying unit 22 is a deadlock or whether the number of requests being processed is 1 (step S13). The application execution control unit 19 refers to information about a request(s) currently being executed, which is stored in the execution management unit 20, to determine whether the number of requests being processed is 1.

When the type of the failure identified by the failure identifying unit 22 is deadlock or when the number of requests being processed is 1 (Yes in step S13), the application execution control unit 19 extracts the identifier of the component in question (component name) whose business logic has been called and the name of an interface thereof from information about the stack of the thread. Based on the information extracted, the application execution control unit 19 issues a failure event including the following information to the distributed management server via the failure event issuing unit 18 (step S14).

Component name (identifier)
Interface name (method name)
Failure type (deadlock, excessive CPU consumption, excessive memory consumption, etc.)
Related component name (identifier)
Related interface name (method name)
Recovery action The related component name and related interface name represent a component and an interface thereof which are believed to cause a failure in relation to the component in question, whose business logic has been called, and the interface thereof. When the number of requests being processed is 1, only the component in question, whose business logic has been called, and the interface thereof are described as the component name and the interface name, and nothing is described as the related component name or related interface name.

When the failure type identified by the failure identifying unit 22 is not deadlock and when the number of requests being processed is more than one (No in step S13), the failure identifying unit 22 sequentially analyzes the acquired thread stack information. In the analysis, the failure identifying unit 22 extracts the identifier of the component (the name of the failed component) and the name of the interface thereof from the thread stack information (step S15). The failure analysis unit 23 analyzes the failure on the basis of the information extracted by the failure identifying unit 22 through the above identification (step S16). The information extraction by the failure identifying unit 22 (step S15) and the failure analysis by the failure analysis unit 23 (step S16) are performed by generating a loop corresponding to the number of requests being processed.

Referring to FIG. 4B, the failure analysis performed by the failure analysis unit 23 (step S16) will be described in detail. In the analysis of a failure, the failure analysis unit 23 checks whether data composed of a pair of the component name and interface name extracted by the failure identifying unit 22 has been entered (exists) as potential data in the potential failure storage unit 24 (step S17).

If such data has been entered as potential data in the potential failure storage unit 24 (Yes in step S17), the failure analysis unit 23 acquires the data from the potential failure storage unit 24 (step S18).

If such data has not been entered as potential data in the potential failure storage unit 24 (No in step S17), the failure analysis unit 23 generates an entry (potential data) as a new cause of the failure by using the identifier of a component and an interface name as keys (step S19). At this time, the failure analysis unit 23 stores, in the entry, a parameter, such as the threshold or recovery action specified in the items for failure detection, in accordance with the failure type detected.

In any of steps S18 and S19, the failure analysis unit 23 increments, by 1, the failure frequency of the component name and interface name extracted by the failure identifying unit 22 (step S20). Note that the processing of step S20 may be performed concurrently with step S18 or step S19 or prior thereto.

FIG. 5 is a conceptual diagram of data stored in the potential failure storage unit 24. In the potential failure storage unit 24, failure type, a frequency, a threshold, and a recovery action are stored as associated with a component name and an interface name thereof. As used herein, the frequency refers to the frequency at which, if the failure monitoring 21 unit detects some failure when an interface of a component is called, the failure monitoring unit 21 has entered the component name and the interface name as a potential cause of a failure.

As described above, a threshold in FIG. 5 refers to a criterion for determining that a failure corresponding to that threshold is occurring. For example, if the type of a failure in the application is excessive memory consumption, CPU load, or the like, the failure analysis unit 23 has difficulty in determining which of multiple application threads which are running in parallel is a direct cause. In this case, a statistical value and criterion need to be used to determine the source location of the failure. The threshold is used as information for determining the source location.

FIG. 5 shows that "excessive memory consumption" has occurred once in a component D and an interface Dm and that the threshold and recovery action corresponding to the "excessive memory consumption" are three times and "forced GC," respectively. FIG. 5 also shows that "excessive CPU consumption" has occurred twice in a component H and an interface Hm and that the threshold and recovery action corresponding to the "excessive CPU consumption" are three times and "change of processing priority," respectively.

The failure analysis unit 23 refers to the data stored in the potential failure storage unit 24 to make a comparison among the failure frequencies and corresponding thresholds of the component names and interface names. The failure analysis unit 23 then determines whether there is a failure frequency which is greater than or equal to the threshold (step S21).

If the frequency serving as a criterion for determining that a failure has occurred reaches (or exceeds) the threshold (Yes in step S21), the failure analysis unit 23 determines (identifies) a call of the interface of the corresponding component as the cause of the failure. Using this information, the failure analysis unit 23 starts processing for issuing a failure event to the distributed management server 27. Details of the event are as described above. The component name and interface name included in the failure event to be issued are the names of the component (first component) and interface (first interface) determined as the cause of the failure by the failure analysis unit 23.

At this time, in addition to the entry determined as the cause of the failure (which has reached or exceeded the threshold), the failure analysis unit 23 extracts a component (second component) and interface (second interface) related to an entry which has not reached the threshold at that time but has the highest frequency (an entry having the second highest failure frequency) (step S22). The thread processing of this potential failure is to be controlled.

The reason for extracting the entry having the highest frequency as a potential failure in addition to the entry determined as the cause of the failure is to obtain the relationship among the components of the application that may cause a failure. In the case of excessive CPU consumption, the cause thereof may be not a call of an interface of a particular component but an overlap between calls of interfaces of multiple components. Even in the case of logic which requires execution of complicated processing when called and significantly consumes the CPU, excessive CPU consumption does not occur if an interface whose load falls within, when the interface is called alone, the allowable range in which the business system runs normally (though may increase temporarily) is called alone. However, when calls of multiple such interfaces overlap each other, excessive CPU consumption would occur.

Note that even when calls of multiple interfaces overlap each other, whether a failure occurs depends on the configuration of the application, the machine specification of the application server, or the like. For this reason, by obtaining a relationship as described above when the business system is running, it is possible to detect a potential failure more accurately and prevent a failure from occurring. This applies not only to excessive CPU consumption but also excessive memory consumption.

There may be multiple components each having a failure frequency reaching or exceeding the threshold. If an interface of a component has already reached or exceeded the threshold when the failure analysis unit 23 determines that the failure frequency of an another component has reached or exceeded the threshold, as described above, the failure analysis unit 23 also may extract the other component (second component) and an interface thereof (second interface) as a potential failure in step S22. As seen above, the number of potential failures extracted by the failure analysis unit 23 is not limited to one and may bet wo or more.

Further, when the failure frequency with respect to excessive CPU consumption of a particular component and an interface thereof reaches or exceeds the threshold, the failure frequency with respect to excessive memory consumption of another component and an interface thereof may reach or exceed the threshold. In such a case, the other component (second component) and the interface thereof (second interface), in which excessive memory consumption has occurred, are extracted as a potential failure in step S22. In contrast, when the failure frequency with respect to excessive memory consumption of a component and an interface thereof reaches or exceeds the threshold, the failure frequency with respect to excessive CPU consumption of another component and an interface thereof may reach or exceed the threshold. In this case also, the other component (second component) and the interface thereof (second interface), in which excessive CPU consumption has occurred, are extracted as a potential failure in step S22.

Note that the component (second component) extracted as a potential failure in step S22 may be different from or the same as the component (first component) determined as the cause of the failure by the failure analysis unit 23. Note that the interface (first interface) determined as the cause of the failure by the failure analysis unit 23 differs from the interface (second interface) extracted as a potential failure thereby.

The failure information event issuing unit 18 includes, in a failure event, the potential failure extracted in step S22 as information about the related component name and related interface name (related information) and then issues the failure event (step S23). After the failure event is issued, the failure analysis unit 23 deletes the data about the entry (potential data) from the potential failure storage unit 24 (step S24).

If the frequency of an entry falls below the threshold (No in step S21), the failure analysis unit 23 determines that the data is not adequate to determine that the entry is the cause of the failure and avoids starting processing for issuing a failure event. The failure analysis unit 23 updates the entry data (potential data) in the potential failure storage unit 24 (step S25). The updated information is stored in the storage device 17 via the failure information storage unit 16.

Due to the above processing, the entry information accumulated in the potential failure storage unit 24 is continuously held by each application server 11 until the component 26 in question is updated or deleted. Accordingly, when the application server 11 is started, the data about the potential failures stored in the storage device 17 in a non-transitory manner is read and again stored in the potential failure storage unit 24.

Figure 6:
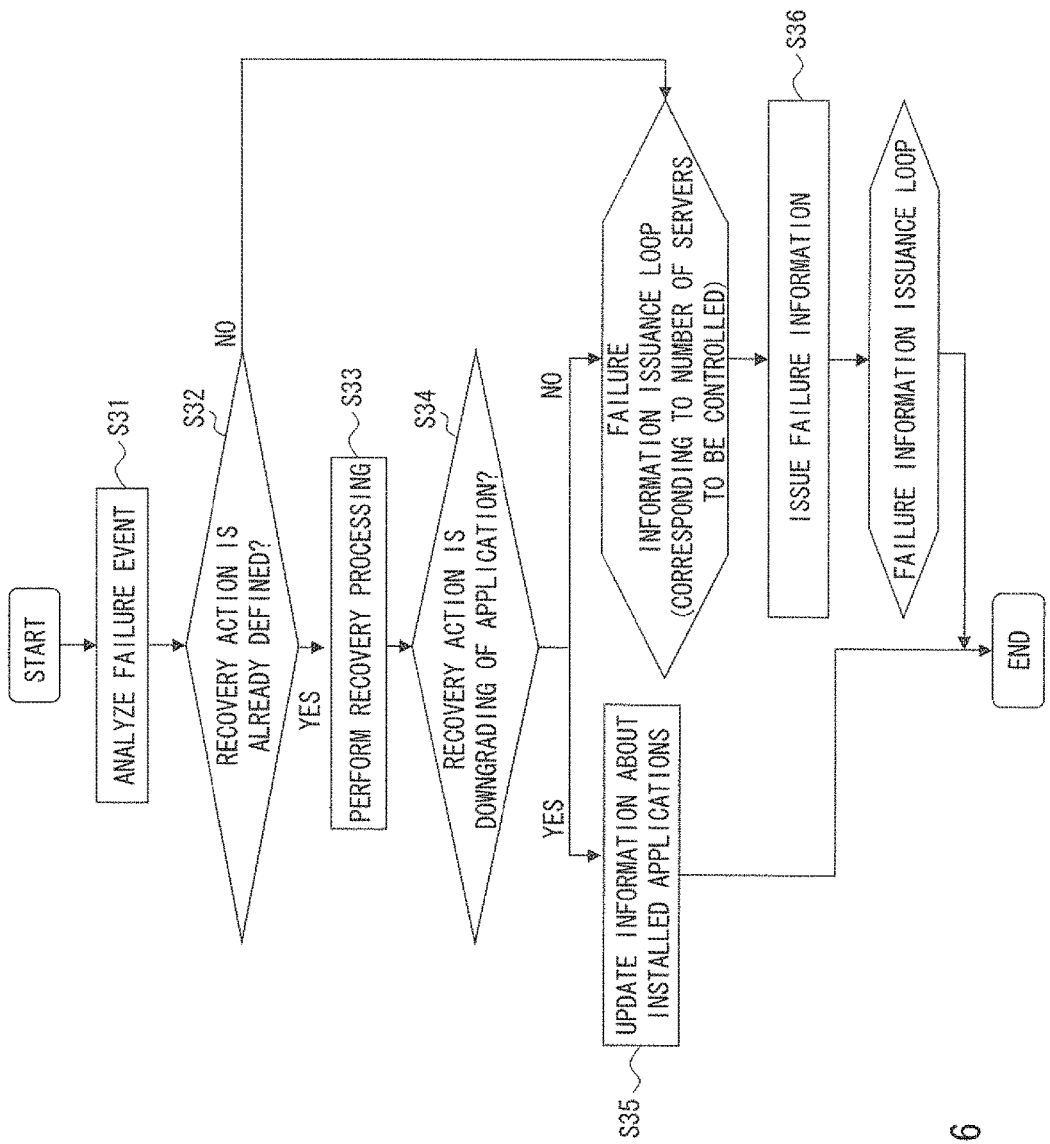
FIG. 6 is a flowchart showing an example of processing performed by the distributed management server according to the second embodiment.

FIG. 6 is a flowchart showing an example of processing performed by the distributed management server 27. Referring to FIG. 6, there will be described processing that the distributed management server 27 performs when the application server 11 issues a failure event to the distributed management server 27 on the basis of the above processing.

First, the distributed management server 27 receives a failure event from the application server 11 via the failure event receiving unit 30 and then analyzes it using the event analysis unit 31 (step S31). The event analysis unit 31 determines whether a recovery action to be taken on the failure is included (defined) in the failure event received (step S32).

If a recovery action to be taken on the failure is included in the failure event (Yes in step S32), the operational action issuing unit 32 issues a recovery action request to the failed application server 11A on the basis of details of the recovery action included in the failure event. In accordance with the recovery action request issued, the application server 11A takes the recovery action (recovery processing) (step S33). Thus, the application server 11A can recover from the failure.

The distributed management server 27 determines whether the recovery action to be taken on the failure is downgrading of the application to a previous version (step S34).

If the recovery action is downgrading of the application to a previous version (Yes in step S34), the distributed management server 27 updates information about the version of the installed applications stored in the application information management unit 29 (step S35). Thus, the distributed management server 27 matches the information about the version of the applications therein with the information about the version of the applications in the application server 11.

If the recovery action is not downgrading (No in step S34), the distributed management server 27 transmits new failure information based on the component identifier and interface name of the application extracted by the event analysis unit 31 to all the application servers 11 under the management thereof via the failure information issuing unit 33 (step S36). The Information transmitted by the distributed management server 27 is as follows.

Component name (identifier)
Interface name (method name)
Failure type (deadlock, excessive memory consumption, excessive CPU consumption, or the like)
Related component name (identifier)
Related interface name (method name)

Note that the failure information issuance processing (step S36) is performed by generating a loop corresponding to the number of the application servers 11 to be managed.

The failure information receiving unit 15 of each application server 11 receives the failure information issued by the failure information issuing unit 33. The application server 11 stores the failure information received in the failure information storage unit 16 and then in the storage device 17. The application server 11 also immediately starts monitoring requests transmitted from system users.

Note that the processing of step S33 may be performed concurrently with or after step S34. Further, the processing of step S33 may be performed concurrently with or after step S35 or concurrently with or after step S36.

FIG. 7 is a conceptual diagram of an example of data stored in the failure information storage unit 16. In FIG. 7, failure type, and related component name and related interface name (related information) are stored as associated with a component name and interface name.

FIG. 7 shows that "deadlock" occurs as a failure in a component A and interface Am and that the component and interface related to that failure are a component B and an interface Bm. FIG. 7 also shows that "deadlock" occurs as a failure in the component B and the interface Bm and that the component and interface related to that failure are the component A and the interface Am. FIG. 7 also shows that "excessive memory consumption" occurs as a failure in a component D and an interface Dm and that "excessive CPU consumption" occurs as a failure in a component H and an interface Hm.

Figure 8:
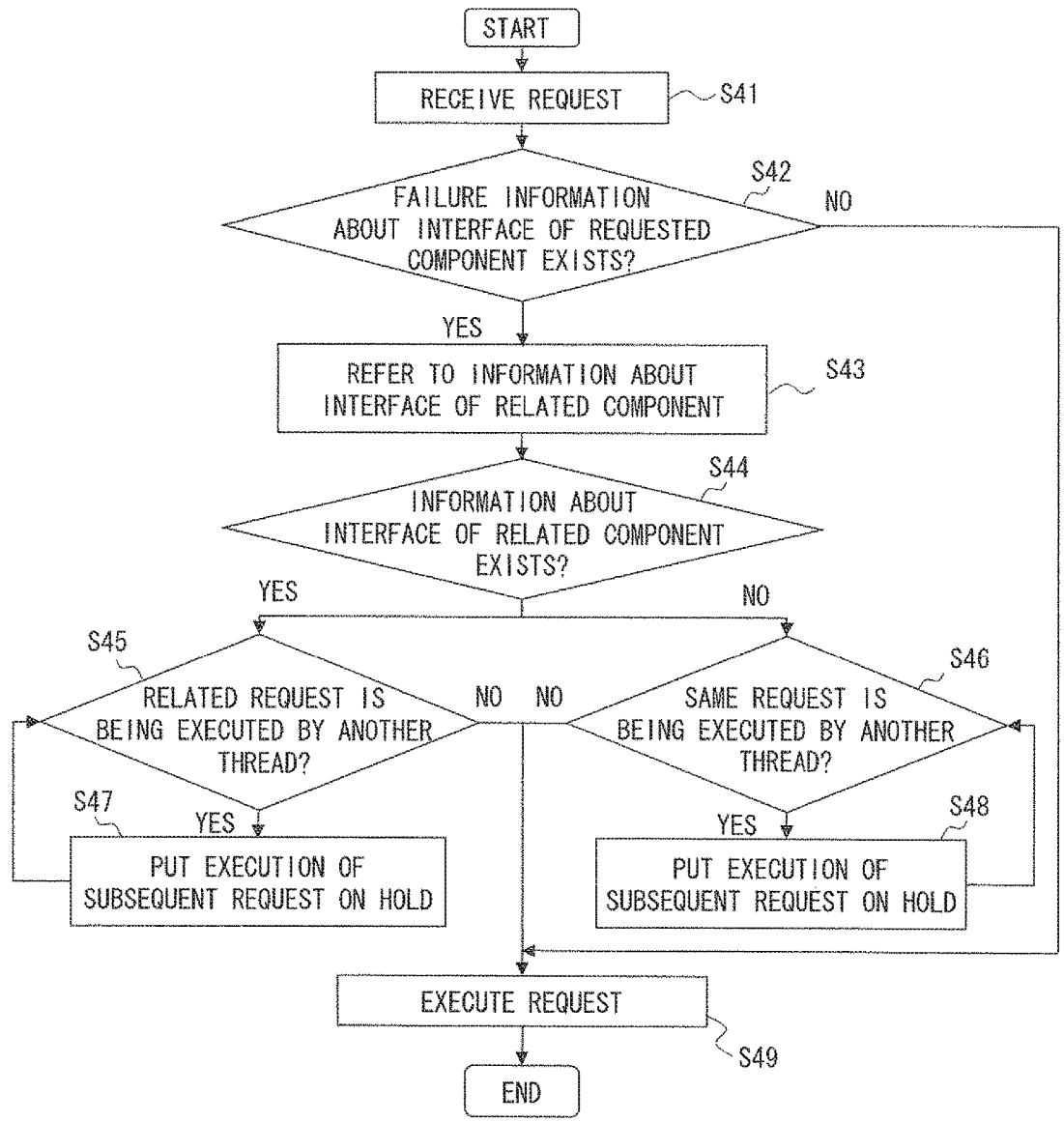
FIG. 8 is a flowchart showing an example of monitoring processing performed by the application server according to the second embodiment.

FIG. 8 is a flowchart showing an example of monitoring processing that the application server 11 performs based on the failure information received. Referring now to FIG. 8, the monitoring performed by the application server 11 will be described.

After starting monitoring, the application execution control unit 19 of the application server 11 receives a request with respect to a request (request-to-request) from a system user via the request receiving unit 12 (step S41).

Using the failure information search unit 25, the application execution control unit 19 determines whether failure information about an interface of a component requested by the system user is stored in the failure information storage unit 16 in the form of a component name and interface name (step S42).

If the failure information is stored (Yes in step S42), the application execution control unit 19 refers to information about an interface of an application related to the interface of the component requested in the failure information (step S43). The application execution control unit 19 then determines whether the failure information includes information about an interface of a related application (step S44). As used herein, the related application refers to an application including "the related component" included in the failure information.

If the failure information includes information about the interface of the related application (that is, information about "the related interface" in the failure information) (Yes in step S44), the application execution control unit 19 determines whether a request corresponding to this interface information (related request) is being executed by a thread other than the thread which is processing the request-to-request (step S45). The application execution control unit 19 makes this determination on the basis of information held by the execution management unit 20.

If the application execution control unit 19 can confirm that the related request is being executed by another thread (Yes in step S45), it puts execution of a subsequent request (request-to-request) on hold until the execution by the other thread is complete (step S47). After predetermined time elapses, the application execution control unit 19 again determines whether the related request is being executed by another thread (step S45).

If the related request is not being executed by another thread (No in step S45), the application execution control unit 19 causes a thread to process a subsequent request (step S49). That is, the application execution control unit 19 executes the request. If the application execution control unit 19 puts execution of a subsequent request on hold in previous step S47, it causes a thread to resume processing the request put on hold.

If the failure information does not include information about the interface of the related component in step S44 (No in step S44), the application execution control unit 19 performs the following processing. The application execution control unit 19 determines whether the request to the interface of the failed component (same request) is being executed by a thread other than the thread which is processing the request-to-request, on the basis of information held by the execution management unit 20 (step S46).

If the same request is being executed by another thread (Yes in step S46), the application execution control unit 19 puts execution of a subsequent request on hold until the execution of the other thread is complete (step S48). After predetermined time elapses, the application execution control unit 19 again determines whether the same request is being executed by another thread (step S46).

If the same request is not being executed by another thread (No in step S46), the application execution control unit 19 causes a thread to process the same request (step S49). That is, the application execution control unit 19 executes the request. If the application execution control unit 19 puts execution of a subsequent request on hold in step S48, it causes a thread to resume processing the request put on hold.

Note that in the on-hold processing in steps S47 and S48, the application execution control unit 19 may determine, after predetermined time elapses, that the processing has timed out and return an appropriate error to the caller, ending the processing of FIG. 8. The application execution control unit 19 performs this processing, for example, on the basis of a parameter specified by the system operator or application server 11.

If the failure occurring in the application server 11A is a deadlock, the application server 11B does not need to perform the processing of any of steps S46 and S48. A deadlock failure occurs when an interface of a component related to a request and an interface of another component exert exclusive control over each other simultaneously. Accordingly, if the interface of the component related to the request has already been executed, a deadlock failure is believed not to occur.

Note that if the related request is not being executed by another thread (No in step S45), the application execution control unit 19 may perform the processing of step S46. Bifurcation based on the determination in step S46 is as described above.

The above monitoring is continuously performed by each application server 11 until the application in question is updated. Accordingly, if the application server 11 is restarted before such update is made, the failure information on the memory of the failure information storage unit 16 would be lost. For this reason, when the application server 11 is started, the failure information stored in a non-transitory manner is read from the storage device 17. The failure information read is again stored in the failure information storage unit 16 by the application execution control unit 19.

Hereafter, imagining a specific situation, the processing of FIGS. 4, 6, and 8 will be further described.

<When Deadlock Occurs>

Imagine a case in which when a business system is running in a particular application server 11A, a deadlock occurs between threads which are processing multiple requests in parallel, due to a defect in an application. The components of the application that has caused the deadlock in the application server 11 are represented by A and B, and call interfaces thereof by Am and Bm. Restart of the application server is predefined as a recovery action taken when a deadlock occurs.

When the deadlock occurs in the application server 11A, the failure monitoring unit 21 in the application server 11A acquires stack information with respect to the threads processing the requests which have caused the deadlock (information including the flow of the call of the threads). Based on the information acquired, the application server 11 issues a failure event to the distributed management server 27. This failure event includes information including the component name (A) and interface name (Am) of the application identified as the source of the deadlock (the cause of the failure) by the failure identifying unit 22, a related component name (B) and related interface name (Bm) corresponding to the component name (A) and interface name (Am), and the failure type "deadlock" and information including the component name (B) and interface name (Bm) of the application identified as the source of the deadlock, the related component name (A) and related interface name (Am) corresponding to the component name (B) and interface name (Bm), and the failure type "deadlock." A recovery action identified here is "restart of the server."

The distributed management server 27 receives the failure event and extracts, through analysis by the event analysis unit 31, failure information indicating that the deadlock has occurred between the interfaces Am and Bm of the components A and B and in which restart of the server is predefined as a recovery action. The distributed management server 27 restarts the failed application server 11A and then transmits the failure information to all the application servers 11 under the management thereof. This failure information includes the component names, the components A and B, and the interface names, the interfaces Am and Bm.

An application server 11B receives the failure information and stores it in the failure information storage unit 16 thereof, as well as immediately starts monitoring requests. The application server 11B then processes a request which is outputted from the client application 34 and is intended to call the interface Am of the component A of the application, using the request receiving unit 12.

The request receiving unit 12 transfers the request to the application execution control unit 19. At this time, the failure information search unit 25 of the application execution control unit 19 confirms that the interface information Am of the component A is present in the failure information storage unit 16. After the confirmation, the application execution control unit 19 inquires of the execution management unit 20 as to whether a call of the related interface Bm of the related component B is already managed as being executed by another thread.

If a call of the interface Bm is being executed by another thread, the application execution control unit 19 puts processing for calling the interface Am of the component A on hold until the processing by the other thread is complete. After the call of the interface Bm of the component B is complete, the application execution control unit 19 releases the call of the interface Am of the component A put on hold to resume the processing.

Figure 9A:
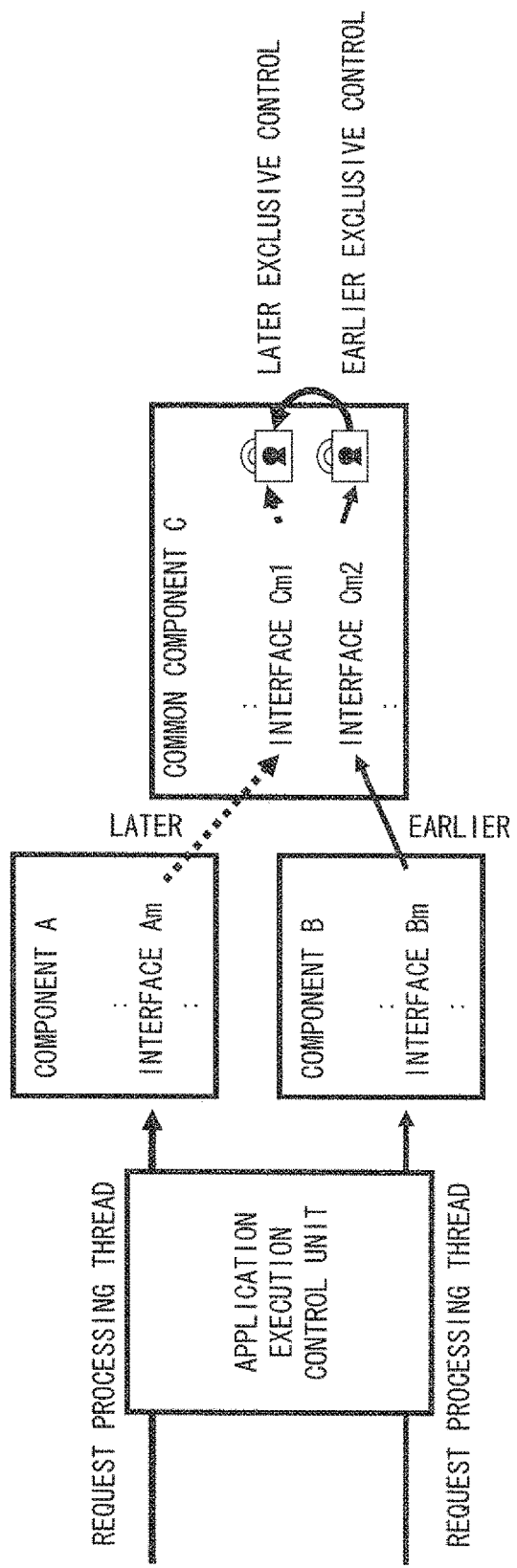
FIG. 9A is a conceptual diagram of the example of request processing control for preventing a deadlock failure according to the second embodiment.

FIG. 9A is a conceptual diagram of the example of request processing control for preventing a deadlock failure described above. In the application server 11B, a request made to the interface Am of the component A reaches the application execution control unit 19 during execution of the processing thread of the request to the interface Bm of the component B.

When the processing thread of the request to the interface Am of the component A is executed, a request is made to the interface Cm1 of a component C. On the other hand, when the processing thread of the request to the interface Bm of the component B is executed, a request is made to the interface Cm2 of the component C. At this time, both interfaces (methods) may exert exclusive control. Depending on the timing at which the processing is executed, a deadlock may occur between the interfaces Cm1 and Cm2.

In the above processing, the execution of the request to the interface Am of component A is put on hold until the request to the interface Bm of the component B is complete. This prevents both interfaces from exerting exclusive control, allowing the interface Cm1 to be executed after the interface Cm2 is executed. In other words, the interfaces Cm1 and Cm2 are executed at different timings. As a result, a deadlock can be avoided.

Figure 9B:
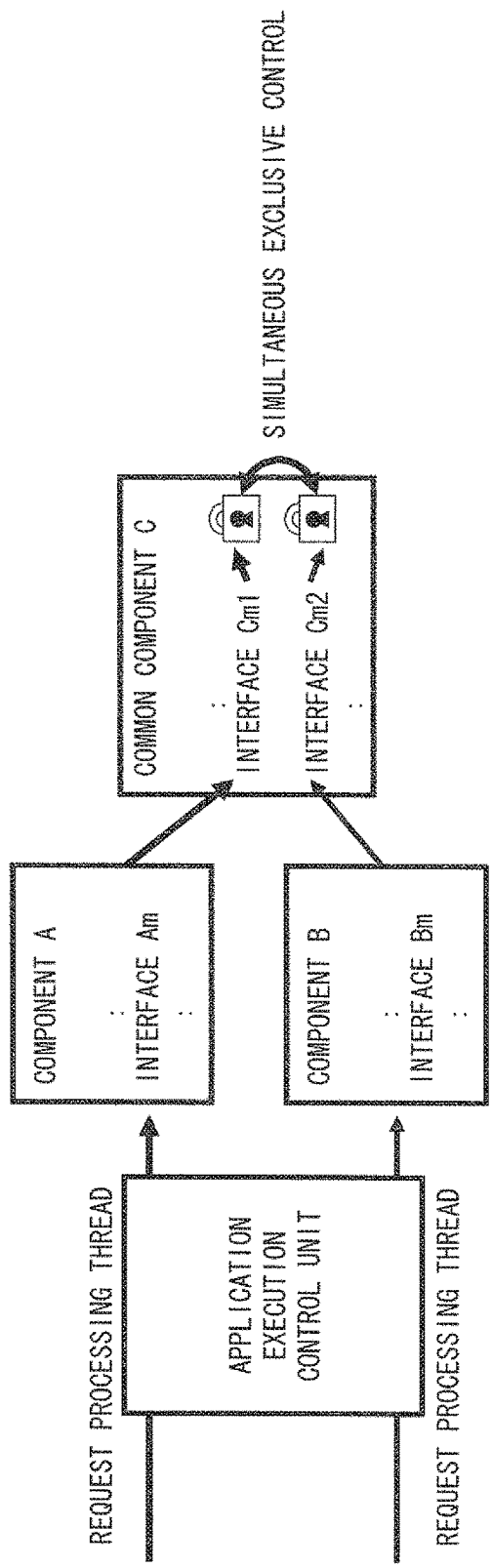
FIG. 9B is a conceptual diagram of request processing control in which a deadlock failure may occur according to the related art.

FIG. 9B is a conceptual diagram of request processing control in which a deadlock failure may occur (according to the related art). FIG. 9B shows a case in which execution of the request to the interface Am of the component A is not put on hold and therefore the interfaces Cm1 and Cm2 exert exclusive control simultaneously, causing a deadlock therebetween.

Not only the application server 11B but also the application server 11C receives the failure information and performs similar processing.

While the case in which a deadlock occurs between the interfaces of the different components, A and B, has been described above, a deadlock may occur between different interfaces of the same component. For example, there can be a case in which when a processing thread of a request to an interface Am1 of the component A is executed, a request is made to the interface Cm1 of the common component C; when a processing thread of a request to an interface Am2 of the component A is executed, a request is made to the interface Cm2 of the common component C. At this time, both interfaces, Am1 and Am2, exert exclusive control. Depending on the timing of the processing, the processing may proceed in such a manner that exclusive control is exerted in an overlapping manner (simultaneously), causing a deadlock according to a principle similar to that in FIG. 9B. As seen above, while the threads are processing the different interfaces, Am1 and Am2, of the same component, A, different exclusive control may be exerted over the common component C.

When the deadlock occurs in the application server 11A, the application server 11 issues a failure event to the distributed management server 27 on the basis of the information acquired by the failure monitoring unit 21. This failure event includes information including the component name (A) and the interface name (Am1) of the application identified as the source of the deadlock (the cause of the failure) by the failure identifying unit 22, a related component name (A) and the related interface name (Am2) corresponding to the component name (A) and the interface name (Am1), and the failure type "deadlock" and information including the component name (A) and the interface name (Am2) of the application identified as the source of the deadlock, the related component name (A) and related interface name (Am1) corresponding to the component name (A) and interface name (Am2), and the failure type "deadlock."

In accordance with the failure event issued, the distributed management server 27 transmits failure information to the application server 11B. The application server 11B performs request processing control for preventing a deadlock failure similar to that described with reference to FIG. 9A. For example, when a request for calling the interface Am1 is made by the client application 34 and when a call of the interface Am2 is already being executed by another thread, the application execution control unit 19 puts processing for calling the interface Am1 on hold until the processing by the other thread is complete. After the processing of calling the interface Am2 is complete, the application execution control unit 19 releases the call of the interface Am1 put on hold to resume the processing.

<When Memory is Consumed Excessively>

Hereafter, using another specific example, the processing of FIGS. 4, 6, and 8 will be further described. Image a case in which during operation of the system, the memory is being consumed excessively due to a defect in the application in the particular application server, 11A. In the description below, in the application server 11, a component of an application which is consuming the memory excessively is represented by A, an interface thereof by Am, the other components by B to E, and interfaces thereof by Bm to Em. Assume that in the data stored in the failure information storage unit 16, the frequency threshold for determining the component as the cause of a failure is "3," and the set recovery action is "forced GC."

When the memory is consumed excessively in the application server 11A at time t1, the failure monitoring unit 21 acquires stack information with respect to a thread which is processing a request. Using the failure identifying unit 22, the application execution control unit 19 identifies a component name and interface name of the failed application from the information acquired. Assume that the following information is acquired.

[Component Name: Interface Name] A:Am, C:Cm, E:Em (Hereafter, Components and Interfaces Corresponding Thereto Will be Represented Similarly.)

At this time, the failure analysis unit 23 newly stores the entry information in the failure information storage unit 16. The frequency of each entry is regarded as 1.

FIG. 10A is a table showing an example of data stored in the failure information storage unit 16 at time t1. The data stored in the failure information storage unit 16 indicates that a failure "excessive CPU consumption" has occurred once in each of A:Am, C:Cm, and E:Em. The data stored also shows that the threshold of each frequency is "3" and that each recovery action is "forced GC." Any of the frequencies of the entries of A:Am, C:Cm, and E:Em has not reached the corresponding threshold. For this reason, the failure event issuing unit 18 does not issue a failure event.

Subsequently, the memory is again excessively consumed in the application server 11A at time t2. Assume that the failure identifying unit 22 acquires the following information.

[Component Name: Interface Name] A:Am, B:Bm, C:Cm

At this time, the failure analysis unit 23 performs processing similar to that described above and adds the entries to the data stored in the failure information storage unit 16 to update the data.

FIG. 10B is a table showing an example of the data in the failure information storage unit 16 at time t2. The data stored in the failure information storage unit 16 indicates that a failure "excessive memory consumption" has occurred twice in A:Am, once B:Bm, twice in C:Cm, and once in E:Em. The failure frequencies of A:Am and C:Cm are each 2 but have yet to reach the corresponding threshold. Accordingly, the failure event issuing unit 18 does not issue a failure event.

Subsequently, the memory is again excessively consumed in the application server 11A at time t3. Assume that the failure identifying unit 22 acquires the following information.

[Component Name: Interface Name] A:Am, D:Dm, E:Em

At this time, the failure analysis unit 23 performs processing similar to that described above and adds the entries to the data stored in the failure information storage unit 16 to update the data.

FIG. 10C is a table showing an example of the data in the failure information storage unit 16 at time t3. The data stored in the failure information storage unit 16 indicates that a failure "excessive memory consumption" has occurred three times in A:Am, once in B:Bm, twice in C:Cm, once in D:Dm, and twice in E:Em.

At this time, the failure frequency of A:Am reaches 3, that is, the threshold. For this reason, the failure analysis unit 23 determines that A:Am is the cause of the failure associated with excessive memory consumption. The failure analysis unit 23 regards C:Cm and E:Em having the highest frequency next to A:Am as related components and related interfaces (related information) with respect to A:Am acting as the cause of the failure. The failure event issuing unit 18 issues, to the distributed management server 27, a failure event indicating the component name and interface name acting as the cause of the failure (A:Am) and the related component names and related interface names (C:Cm and E:Em).

The subsequent processing, that is, execution of a recovery action and issuance of failure information to the application server 11 by the distributed management server 27, and processing and request processing thread execution control that each application server 11 performs after receiving the failure information are as described above.

Figure 11A:
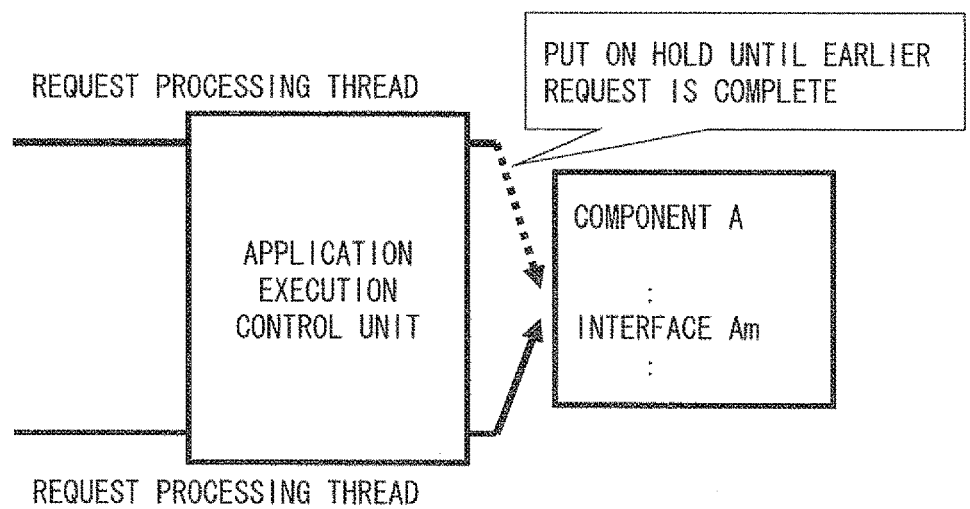
FIG. 11A is a conceptual diagram of an example of the request processing control for preventing an excessive memory consumption failure according to the second embodiment.

FIG. 11A is a conceptual diagram of an example of the request processing control for preventing an excessive memory consumption failure described above. In FIG. 11A, multiple requests made to the interface Am of the component A reach the application execution control unit 19 in the application server 11B.

If the interface Am of the component A is an interface that consumes the memory excessively, calls of the interface Am by multiple requests would cause a memory shortage.

For this reason, the application server 11B puts execution of the request later made to the interface Am of the component A on hold until the (preceding) request earlier made to the interface Am of the component A is complete. This prevents calls based on multiple requests from being made in the application server 11B, allowing avoidance of a memory shortage. In other words, the application server 11B performs control so that the interface Am of the component A is not simultaneously executed by multiple threads.

Note that failure information may indicate that the interface Cm of the component C is a potential failure having the (second) highest frequency next to the interface Am of the component A, and in the application server 11B, the interface Cm is being executed by a thread other than the thread which is executing the interface Am. In this case, the application server 11B puts execution of the interface Am of the component A on hold until the execution of the interface Cm is complete. In addition, the application server 11B may put execution of the interface Cm of the component C on hold until the execution of the interface Am is complete. Since the application server 11B performs control in this way, it is possible to prevent calls of interfaces of multiple components and causing a failure. Even when an interface of a component which has already reached or exceeded the threshold is recorded as a potential failure or even when an interface of a component whose failure frequency with respect to CPU excessive consumption has reached or exceeded the threshold is recorded as a potential failure, the application server 11B can perform similar control.

Note that the different interface, Am2, of the same component, A, may be described as a potential failure having the highest frequency next to the interface Am of the component A. In this case, if the interface Am2 is being executed by a thread other than the thread which is executing the interface Am, the application server 11B puts execution of the interface Am on hold until execution of the interface Am2 is complete.

Figure 11B:
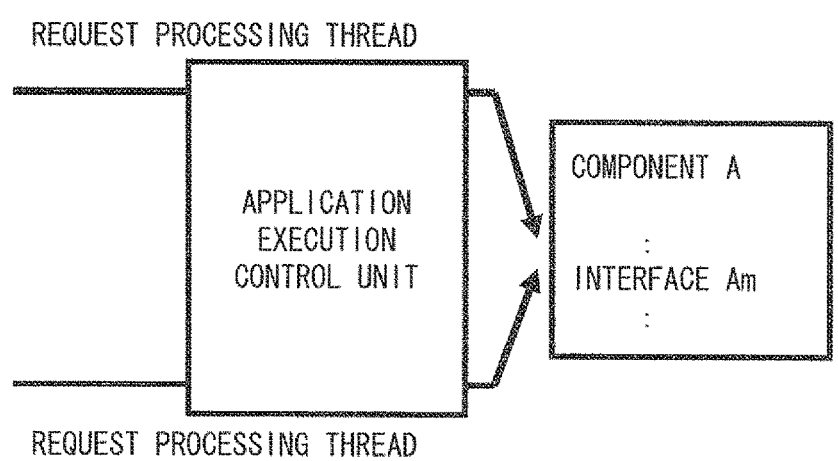
FIG. 11B is a conceptual diagram of request processing control in which an excessive memory consumption failure can occur according to the related art.

FIG. 11B is a conceptual diagram of request processing control in which an excessive memory consumption failure can occur according to the related art. In FIG. 11B, multiple requests are made to the interface Am of the component A and then each call the interface Am, causing a memory shortage failure.

<When CPU is Consumed Excessively>

Hereafter, using yet another specific example, the processing of FIGS. 4, 6, and 8 will be further described. Image a case in which during operation of the system, the CPU is consumed excessively due to a defect in an application in the particular application server 11A. In the description below, in the application server 11, a component of an application which consumes the CPU excessively is represented by A, an interface thereof by Am, the other components by B to E, and interfaces thereof as Bm to Em. Assume that in the data stored in the failure information storage unit 16, the frequency threshold for determining that the component is the cause of the failure is to "3," and the set recovery action is "forced GC."

When the CPU is consumed excessively in the application server 11A at time t4, the failure monitoring unit 21 acquires stack information with respect to a thread which is executing a request. From the information obtained, the application execution control unit 19 identifies the component name and the interface name of the failed application by using the failure identifying unit 22. Assume that the following information is acquired.

[Component Name: Interface Name] A:Am, C:Cm, E:Em (Hereafter, Components and Interfaces Corresponding Thereto Will be Represented Similarly.)

At this time, the failure analysis unit 23 stores each entry information in the failure information storage unit 16. The frequency of each entry is regarded as 1.

FIG. 12A is a table showing an example of the data in the failure information storage unit 16 at time t4. The data stored in the data in the failure information storage unit 16 indicates that a failure "excessive CPU consumption" has occurred once in each of A:Am, C:Cm, and E:Em. The data stored also indicates that the threshold of each frequency is "3" and that each recovery action is "forced GC." Any of the frequencies of the entries of A:Am, C:Cm, and E:Em has not reached the corresponding threshold. For this reason, the failure event issuing unit 18 does not issue a failure event.

Subsequently, the CPU is again excessively consumed in the application server 11A at time t5. Assume that the failure identifying unit 22 acquires the following information.

[Component Name: Interface Name] A:Am, B:Bm, C:Cm

At this time, the failure analysis unit 23 performs processing similar to that described above and then adds the entries to the data stored in the failure information storage unit 16 to update the data.

FIG. 12B is a table showing an example of the data in the failure information storage unit 16 at time t5. The data stored in the failure information storage unit 16 indicates that a failure "excessive CPU consumption" has occurred twice in A:Am, once in B:Bm, twice in C:Cm, and once in E:Em. The failure frequencies of A:Am and C:Cm are 2 and have yet to reach the corresponding threshold. Accordingly, the failure event issuing unit 18 does not issue a failure event.

Subsequently, the CPU is again excessively consumed in the application server 11A at time t6. Assume that the failure identifying unit 22 acquires the following information.

[Component Name: Interface Name] A:Am, D:Dm, E:Em

At this time, the failure analysis unit 23 performs processing similar to that described above and adds the entries to the data stored in the failure information storage unit 16 to update the data.

FIG. 12C is a table showing an example of the data in the failure information storage unit 16 at time t6. The data stored in the failure information storage unit 16 indicates that a failure "excessive CPU consumption" has occurred three times in A:Am, once in B:Bm, twice in C:Cm, once in D:Dm, and twice in E:Em.

The failure frequency of A:Am has reached 3, that is, the threshold. For this reason, the failure analysis unit 23 determines that A:Am is the cause of the failure associated with the excessive CPU consumption. The failure analysis unit 23 also regards C:Cm and E:Em having the second highest frequency as related components and related interfaces with respect to A:Am acting as the cause of the failure. The failure event issuing unit 18 issues, to the distributed management server 27, a failure event indicating the component name and interface name acting as the cause of the failure (A:Am) and the request component names and related interface names (C:Cm and E:Em).

The subsequent processing, that is, execution of a recovery action and issuance of failure information to the application server 11 by the distributed management server 27, and processing and request processing thread execution control that each application server 11 performs after receiving the failure information are as described above.

Figure 13A:
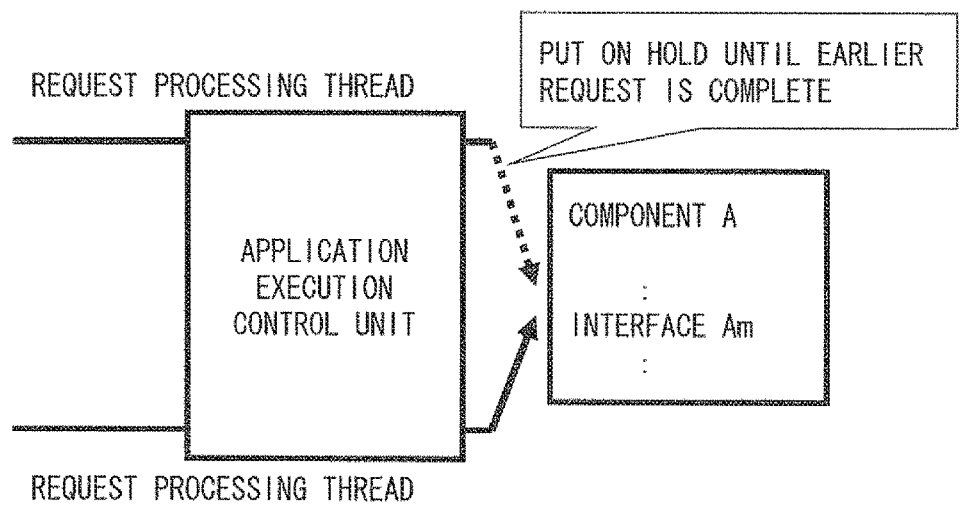
FIG. 13A is a conceptual diagram of an example of the request processing control for preventing excessive CPU consumption according to the second embodiment.

FIG. 13A is a conceptual diagram of an example of the request processing control for preventing excessive CPU consumption described above. In FIG. 13A, multiple requests made to the interface Am of the component A reach the application execution control unit 19 in the application server 11B.

If the interface Am of the component A is an interface that consumes the CPU excessively, calls of the interface Am based on the multiple requests would cause a delay in the processing of another request, or the like.

The application server 11B puts execution of the request made later to the interface Am of the component A on hold until the request made earlier to the interface Am of the component A is complete. This prevents calls based on multiple requests from being made in the application server 11B, allowing avoidance of a delay in the processing of another request, or the like. In other words, the application server 11B performs control so that the interface Am of the component A is not simultaneously executed by multiple threads.

Note that failure information may indicate that the interface Cm of the component C is a potential failure having the (second) highest frequency next to the interface Am of the component A, and in the application server 11B, the interface Cm is being executed by a thread other than the thread which is executing the interface Am. In this case, the application server 11B puts execution of the interface Am of the component A on hold until the execution of the interface Cm is complete. Since the application server 11B performs control in this way, it is possible to prevent calls of interfaces of multiple components and causing a failure. Even when an interface of a component which has already reached or exceeded the threshold is recorded as a potential failure or even when an interface of a component whose failure frequency with respect to excessive memory consumption has reached or exceeded the threshold is recorded as a potential failure, the application server 11B can perform similar control.

Note that the different interface, Am2, of the same component, A, may be described as a potential failure having the highest frequency next to the interface Am of the component A. In this case, if the interface Am2 is being executed by a thread other than the thread which is executing the interface Am, the application server 11B puts execution of the interface Am on hold until the execution of the interface Am2 is complete. In addition, the application server 11B may put execution of the interface Am2 of the component A on hold until the execution of the interface Am is complete.

Figure 13B:
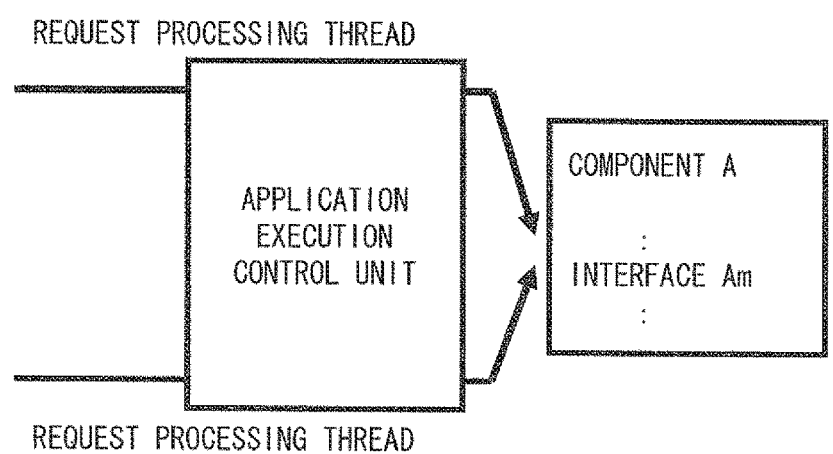
FIG. 13B is a conceptual diagram of request processing control in which an excessive CPU consumption failure can occur according to the related art.

FIG. 13B is a conceptual diagram of request processing control in which an excessive CPU consumption failure can occur according to the related art. In FIG. 13B, multiple requests are made to the interface Am of the component A and then each call the interface, causing a delay in the processing of another request, or the like.

The processing in the distributed management system 10 according to the second embodiment described above is summarized. The application server in which a failure has occurred analyzes information about resources, such as the memory, threads, or CPU, and identifies or predicts the cause of the application failure on a component or interface basis. Thus, in coping with the application failure which may affect the entire system, the system operator does not need to identify the cause of the failure (or make a statistical prediction), allowing the load on the system operator to be reduced.

The failed application server then transmits the analysis result to the other application servers having the same configuration so as to share the failure information with the other application servers. The other application servers receive the failure information transmitted by the failed application server and accumulate the failure information so as to prevent a failure similar to the failure which has occurred in the failed application server. In accordance with the failure information accumulated, the application server monitors requests to the application, as well as controls the order or timing of execution of the requests.

Effects of the distributed management system 10 according to the second embodiment are as follows. First, the system including distributed multiple application servers can prevent a failure which is caused by a defect in an application and which may affect the entire system. The reason is that since failure information about the defect in the application is transmitted to the other application servers, an application server which has received the failure information transmitted can control execution of the application so that the same failure does not occur in the application server.

An application failure, such as a deadlock or memory failure, often occurs based on a particular processing pattern. For this reason, if an application server analyzes the pattern and previously controls a call of the application so that the processing pattern does not occur, it is possible to stably run the entire distributed management system. In other words, the application server can perform monitoring and procedure specialized in the location of a failure similar to the failure which has occurred in another application server and which may occur in the future. In performing the monitoring and procedure, the application server controls the order or timing of execution of requests to the application.

A second effect is that the load on the system operator can be reduced. The reason is that the distributed management system 10 can automatically take a (e.g., temporary) countermeasure against the failure without involving an operation by the system operator.

Typically, a fundamental solution to a failure which is caused by a defect in an application requires modification of the application program. That is, a failure can recur until components running on all application servers are updated. Modification of the application program, testing of the modified program, and an update of components on the application server require a certain period of time.

For this reason, when a similar failure occurs in a situation in which the system must continue running unavoidably before the components are updated, some temporary measure must be taken, including restart of the application server by the system operator. In this case, as the number of application servers increases, a failure is more likely to occur in the application. Accordingly, the system operator is more likely to have to bear an excessive workload.

However, the distributed management system 10 according to the second embodiment, instead of the system operator, controls the execution of the application so that the application server itself prevents recurrence of a failure. As a result, the system operator does not need to take such a measure, whatever the number of application servers may be.

System models using cloud computing technology have been increasingly constructed in recent years. Most of such systems include a great number of server machines which are distributed on many networks. Application servers serving as server machines often have the same configuration. Since most of such systems have a load distribution configuration, an abnormality in a single server (which is caused by a failure or the like) is less likely to affect the entire system (that is, less likely to cause the entire system to fail).

However, if the business application itself which is running on each application server contains a defect, a failure caused by this error in a single application server may result in successive occurrence of similar failures in other application servers in the near future. As a result, this failure may reduce the performance of the entire system or affect the non-working time thereof. Further, the failure may result in a quality problem with respect to the service level agreement (SLA) of the system, or the like. In this case, the system operator must unavoidably take a temporary measure, unless there is taken a measure, such as downgrading of the failed application to a previous version. Further, as the number of servers increases, such a failure is more likely to occur, resulting in an increase in the operating cost for taking temporary measures.

As described above, however, a defect in the application often occurs based on a particular processing pattern. For this reason, if the application server analyzes this pattern and previously controls a call of the application so that the failure pattern does not occur, the system can more likely be run stably. On the other hand, recovery of the application from the error mostly requires a sufficient evaluation period and sufficient operating cost so as not to cause similar problems.

In view of the foregoing, it seems necessary to construct a mechanism which performs control so that the system can be run as stably as possible, without imposing a load on the system operator if possible while using the application containing the failure. In this case, it seems important that the system be capable of being run as stably as possible even if the processing performance degrades to some extent. This is because it is possible to achieve an important object of preventing an economic loss associated with an increase in operating cost and the non-operation of the system which occur before the failure is fundamentally solved.

As described above, Japanese Unexamined Patent Application Publication Nos. 2010-9127 and 2006-338069 do not consider a situation in which multiple servers, such as application servers, are disposed as in cloud computing.

Specifically, a system according to Japanese Unexamined Patent Application Publication No. 2010-9127 accumulates failure information on the basis of a unique determination criterion and transmits failure information detected based on the determination criterion to a dedicated administrator terminal. However, Japanese Unexamined Patent Application Publication No. 2010-9127 does not consider an environment in which application servers and the like are distributed. On the other hand, the distributed management system according to the second embodiment has a mechanism which transmits failure information to a distributed environment and prevents a failure on the basis of the failure information.

For a system according to Japanese Unexamined Patent Application Publication No. 2006-338069, when the system predicts or detects failure information on the basis of a unique determination criterion, it replaces components to prevent the entire system from failing. However, this processing assumes that there are running alternative components. In other words, unless there are such components, it is not possible to obtain the effect of preventing the entire system from failing. On the other hand, the distributed management system 10 according to the second embodiment does not need to consider replacement of components. Even if a component of the application contains a defect, the distributed management system can control the operation of the application by identifying the defect, as well as can make most use of the component in such a manner that a system failure does not occur.

The distributed management system according to the second embodiment also produces the following effects. When a failure occurs in the application, the application server 11A generates a failure event (failure information) including information identifying a recovery action (recovery processing) necessary for the application server 11A to recover from the failure. The distributed management server 27 extracts the information identifying a recovery action from the failure event issued by the application server 11A and transmits the information to the application server 11A. Based on the information identifying a recovery action transmitted by the distributed management server 27, the application server 11A executes the failure recovery action. Thus, even if, when a failure occurs, the application server 11A itself cannot execute a failure recovery action, it can execute a failure recovery action by performing processing based on a request from the distributed management server 27. Further, even when a failure occurs, the system operator does not need to perform the control of a recovery action in each application server 11, and the distributed management server 27 can control a recovery action. Thus, the load on the system operator can be reduced.

A failure in the application of the application server 11A occurs on the basis of a request from a client thereof. The application server 11B monitors requests from a client thereof on the basis of a failure event generated by the application server 11A. Thus, the distributed management system 10 can prevent failures from being caused by requests from clients.

When a failure greater than or equal to the threshold occurs in an interface of a component (first interface) in the application server 11A, the application server 11A identifies the first interface as the cause of the failure. Further, the application server 11A outputs a failure event including, as information related the failure, another interface (second interface) in which a failure has occurred at the highest frequency next to that of the first interface. When the first interface is requested by a client, the application server 11B determines whether the second interface is being executed by a thread, on the basis of the failure event. If the second interface is being executed, the application server 11B puts execution of the request on hold. This prevents execution of processing which is estimated to be related to the cause of the failure. As a result, the distributed management system 10 can prevent a failure more accurately.

When a failure greater than or equal to the threshold occurs in an interface of a component (first interface) in the application server 11A, the application server 11A identifies the first interface as the cause of the failure. Further, the application server 11A outputs a failure event including, as information related the failure, another interface (third interface) in which a failure greater than or equal to the threshold has occurred. When the first interface is requested by a client, the application server 11B determines whether the third interface is being executed by a thread, on the basis of the failure event. If the third interface is being executed, the application server 11B puts execution of the request on hold. This prevents execution of processing which is estimated to be related to the cause of the failure. As a result, the distributed management system 10 can prevent a failure more accurately.

When a failure greater than or equal to the threshold occurs in an interface of a component (first interface) in the application server 11A, the application server 11A identifies the first interface as the cause of the failure. Further, the application server 11A outputs a failure event including, as information related the failure, another interface (second interface) in which a failure has occurred. When the first interface is requested by a client, the application server 11B determines whether the second interface is being executed by a thread, on the basis of the failure event. If the second interface is being executed, the application server 11B puts execution of the request on hold. This prevents execution of processing which is estimated to be related to the cause of the failure. As a result, the distributed management system 10 can prevent a failure more accurately.

In the above case, when the first interface is requested by a client, the application server 11B determines whether the first interface is being executed by a thread, on the basis of the failure event. If the first interface is being executed, the application server 11B puts execution of the request on hold. Thus, it is possible to further reduce the number of threads which simultaneously execute the processing identified as the cause of the failure. As a result, the distributed management system 10 can prevent a failure more accurately.

A failure in the first interface and a failure in the second interface are each for memory usage to reach or exceed the criterion or for CPU usage to reach or exceed the criterion. Thus, the distributed management system 10 can accurately prevent a failure caused by the application from occurring frequently. A failure in the first interface may be for memory usage to reach or exceed the criterion, and a failure in the second interface may be for CPU usage to reach or exceed the criterion. As seen above, with respect to failures which are of different types but have a common character of taking time in being handled, the application server includes, in a failure event, information about components and interfaces which have caused the failures, as information identifying the failures and information related to the failures, and transmits the failure event. Thus, it is possible to further reduce the number of threads which simultaneously perform processing which causes failures having similar characters. As a result, the distributed management system 10 can prevent a failure more accurately.

When a deadlock occurs as a failure between an interface of a component (first interface) and another interface (second interface) in the application server 11A, the application server 11A outputs a failure event identifying the first and second interfaces as the cause of the failure. When the first interface is requested by a client, the application server 11B determines whether the second interface is being executed by a thread, on the basis of the failure event. When the second interface is being executed, the application server 11B puts processing of the request on hold. As a result, the application server 11 of the distributed management system 10 can reliably prevent a deadlock.

The distributed management system according to the second embodiment is applicable to middleware, such as Web application servers or computer management applications. Thus, it is possible to suppress a system stop (or the period thereof) associated with a defect in the application. It is also possible to reduce the load imposed on the system operator in coping with a failure.

The present invention is not limited to the above embodiments, and changes can be made to the embodiments as appropriate without departing from the spirit and scope of the invention.

For example, the application components in the distributed management system 10 according to the second embodiment may be replaced with modules or system components forming a Web application server or the like, and subsequently the configuration and processing of a distributed management system thus formed may be configured as in FIGS. 1 to 11. Even in this case, it is possible to prevent a failure, such as a deadlock or memory shortage, when operating a distributed application server.

While deadlock and excessive CPU or memory consumption are used as examples in the second embodiment, the type of a failure is not limited thereto. Similar processing may be performed with respect to the consumption of other resources of the computer.

According to an aspect of the present invention, it is possible to provide a distributed system, server computer, distributed management server, and failure prevention method that prevent a failure in a server without imposing a load on the system operator.

The whole or part of the exemplary embodiments disclosed above can be described as, but not limited to, the following supplementary notes.

(Supplementary Note 1)

A distributed system comprising first and second servers capable of executing the same application, wherein when a failure occurs in the application in the first server, the first server generates failure information identifying a cause of the failure in the application, and the second server performs failure prevention processing which is determined based on the failure information and intended to prevent a failure in the application.

(Supplementary Note 2)

The distributed system according to supplementary note 1, further comprising a distributed management server configured to manage the first and second servers, wherein when a failure occurs in the application, the first server generates the failure information including information identifying recovery processing necessary for the first server to recover from the failure, the distributed management server extracts the information identifying the recovery processing from the failure information and transmits the information extracted to the first server, and the first server performs the recovery processing from the failure on the basis of the information identifying the recovery processing transmitted from the distributed management server.

(Supplementary Note 3)

The distributed system according to supplementary note 1 or 2, wherein the failure in the application in the first server occurs based on a request from a client of the first server, and the second server monitors a request from a client of the second server on the basis of the failure information.

(Supplementary Note 4)

The distributed system according to supplementary note 3, wherein the first and second servers each include a plurality of components related to the application, when a failure greater than or equal to a threshold occurs in a first interface of a first component in the first server, the first server identifies the first interface as a cause of the failure and outputs the failure information including a second interface of a second component as information related to the failure, the second interface being an interface which has had the most failures next to the first interface among interfaces of the components, and when the first interface is requested by a client of the second server, the second server determines whether the second interface is being executed by a thread, on the basis of the failure information and, if the second interface is being executed, prevents processing of the request.

(Supplementary Note 5)

The distributed system according to supplementary note 3 or 4, wherein the first and second servers each include a plurality of components related to the application, when a failure greater than or equal to a threshold occurs in a first interface of a first component in the first server and when a failure greater than or equal to the threshold occurs in a second interface of a second component in addition to the first interface, the first server identifies the first interface as a cause of the failure and outputs the failure information including the second interface as information related to the failure, and when the first interface is requested by a client of the second server, the second server determines whether the second interface is being executed by a thread, on the basis of the failure information and, if the second interface is being executed, prevents processing of the request.

(Supplementary Note 6)

The distributed system according to supplementary note 4 or 5, wherein when the first interface is requested by a client of the second server, the second server determines whether the first interface is already being executed by a thread, on the basis of the failure information and, if the first interface is being executed, prevents processing of the request.

(Supplementary Note 7)

The distributed system according to supplementary note 3, 4, or 5, wherein the first and second servers each include a plurality of components related to the application, when a deadlock occurs as the failure between a first interface of a first component and a second interface of the second component in the first server, the first server outputs the failure information identifying the first and second interfaces as a cause of the failure, and when the first interface is requested by a client of the second server, the second server determines whether the second interface is being executed by a thread, on the basis of the failure information and, if the second interface is being executed, prevents processing of the request.

(Supplementary Note 8)

A server computer disposed in a distributed system and connected to another server computer capable of executing the same application, wherein when a failure occurs in the application, the server computer generates failure information identifying a cause of the failure in the application, and when the other server generates failure information identifying a cause of a failure in the application, the server computer performs failure prevention processing which is determined based on the failure information and intended to prevent a failure in the application.

(Supplementary Note 9)

A distributed management server disposed in a distributed system including first and second servers capable of executing the same application, wherein when the distributed management server receives, from the first server, failure information identifying a cause of a failure in the application in the first server, the distributed management server transmits, to the second server, the failure information serving as information that the second server uses to perform failure prevention processing for preventing a failure in the application.

(Supplementary Note 10)

In a distributed system including first and second servers capable of executing the same application, a failure prevention method for preventing a failure in the application, comprising:

when a failure occurs in the application in the first server, generating, by the first server, failure information identifying a cause of the failure in the application, and performing, by the second server, failure prevention processing which is determined based on the failure information and intended to prevent a failure in the application.

(Supplementary Note 11)

The distributed system according to supplementary note 4, 5, or 6, wherein the failure in the first interface and the failure in the second interface are each for memory usage to exceed a criterion or for CPU usage to exceed a criterion.

(Supplementary Note 12)

The distribution according to supplementary note 11, wherein the failure in the first interface is one of for memory usage to exceed the criterion and for CPU usage to exceed the criterion, and the failure in the second interface is the other of for memory usage to exceed the criterion and for CPU usage to exceed the criterion.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A system comprising:
   a first server configured to run a first application, the first server configured to send information related to a failure of the first server to a second server upon the first application running on the first server failing; and
   the second server configured to run a second application which is different from the first application, the second server configured to perform failure prevention processing based on the information to prevent a related failure in the second application running on the second server,
   wherein the second server, which is configured to perform the failure prevention processing, is configured to monitor the state of the second server every predetermined time after receiving the information from the first server to determine whether the second server executes the failure prevention processing.

2. The system according to claim 1, wherein the information related to a failure of the first server indicates one or more of:
   a component of the application that caused the failure;
   an interface associated with the component that caused the failure.

3. The system according to claim 1, wherein the second server is configured to monitor requests to the second application, as well as to control the order or timing of execution of the requests based on the information.

4. A server, wherein
   the server is configured to receive, from a different server from the server configured to run a first application, information related to a failure of the different server upon the first application running on the different server failing;
   the server is configured to run a second application which is different from the first application; and
   the server is configured to perform failure prevention processing based on the information to prevent a related failure in the second application running on the server,
   wherein the server, which is configured to perform the failure prevention processing, is configured to monitor the state of the server every predetermined time after receiving the information from the different server to determine whether the server executes the failure prevention processing.

5. The server according to claim 4, wherein the server is configured to monitor the state of the server every predetermined time after receiving the information from the different server to determine whether the server executes the failure prevention processing.

6. The server according to claim 4, wherein the information related to a failure of the different server indicates one or more of:
   a component of the application that caused the failure;
   an interface associated with the component that caused the failure.

7. The server according to claim 4, wherein the server is configured to monitor requests to the second application, as well as to control the order or timing of execution of the requests based on the information.

8. A method comprising:
   running, by a first server, a first application;
   running, by a second server, a second application which is different from the first application;
   sending, by the first server, information related to a failure of the first server to the second server upon the first application running on the first server failing;
   monitoring, by the second server that is configured to perform the failure prevention processing, the state of the second server every predetermined time after receiving the information from the first server to determine whether the second server executes the failure prevention processing; and
   performing, by the second server, failure prevention processing based on the information to prevent a related failure in the second application running on the second server.

9. The method according to claim 8, wherein the information related to a failure of the first server indicates one or more of:
   a component of the application that caused the failure;
   an interface associated with the component that caused the failure.

10. The method according to claim 8, further comprising:
    monitoring, by the second server, requests to the second application, as well as controlling the order or timing of execution of the requests based on the information.

11. A method performed by a server, comprising:
    receiving, from a different server configured to run a first application, information related to a failure of the different server upon the first application running on the different server failing;
    running a second application which is different from the first application;
    monitoring, by the server that is configured to perform the failure prevention processing, the state of the server every predetermined time after receiving the information from the different server to determine whether the server executes the failure prevention processing; and
    performing failure prevention processing based on the information to prevent a related failure in the second application running on the server.

12. The method according to claim 11, wherein the information related to a failure of the different server indicates one or more of:
- a component of the application that caused the failure;
- an interface associated with the component that caused the failure.

13. The method according to claim 11, further comprising:
- monitoring requests to the second application, as well as controlling the order or timing of execution of the requests based on the information.

14. A non-transitory computer readable medium storing a program that causes a server to execute:
- a step of receiving, from a different server from the server configured to run a first application, information related to a failure of the different server upon the first application running on the different server failing;
- a step of running a second application which is different from the first application;
- a step of monitoring, by the server that is configured to perform the failure prevention processing, the state of the server every predetermined time after receiving the information from the different server to determine whether the server executes the failure prevention processing; and
- a step of performing failure prevention processing based on the information to prevent a related failure in the second application running on the server.

15. The non-transitory computer readable medium storing the program according to claim 14, wherein the information related to a failure of the different server indicates one or more of:
- a component of the application that caused the failure;
- an interface associated with the component that caused the failure.

16. The non-transitory computer readable medium storing the program according to claim 14, the program further causing the server to execute:
- a step of monitoring requests to the second application, as well as controlling the order or timing of execution of the requests based on the information.

* * * * *